United States Patent [19]

Kubo et al.

[11] Patent Number: 5,681,241

[45] Date of Patent: Oct. 28, 1997

[54] AUTOMATIC TRANSMISSION FOR AUTOMOTIVE VEHICLES

[75] Inventors: Kunihiro Kubo, Nishio; Yoriaki Ando, Nagoya; Naoki Hakamada, Okazaki, all of Japan

[73] Assignee: Nippon Soken, Inc., Nishio, Japan

[21] Appl. No.: 450,588

[22] Filed: May 31, 1995

[30] Foreign Application Priority Data

May 31, 1994 [JP] Japan .................... 6-142298

[51] Int. Cl.$^6$ .................................. F16H 61/26
[52] U.S. Cl. ............................ 477/130; 477/906
[58] Field of Search ...................... 477/130, 131, 477/161, 906, 143, 155; 475/127, 128

[56] References Cited

U.S. PATENT DOCUMENTS

| | | | |
|---|---|---|---|
| 4,519,273 | 5/1985 | Shimizu et al. | 475/128 |
| 4,607,542 | 8/1986 | Sugano | 475/128 |
| 5,014,577 | 5/1991 | Takada et al. | 477/906 |
| 5,085,103 | 2/1992 | Ando et al. | 477/131 |
| 5,361,651 | 11/1994 | Wakahara | 477/130 |
| 5,556,356 | 9/1996 | Hakamada et al. | 477/163 |

*Primary Examiner*—Charles A. Marmor
*Assistant Examiner*—Sherry Lynn Estremsky
*Attorney, Agent, or Firm*—Cushman, Darby & Cushman IP Group of Pillsbury Madison & Sutro LLP

[57] ABSTRACT

A hydraulic control system for an automatic transmission of an automotive vehicle is provided which has a fail-safe function of preventing unsafe operation of the automatic transmission if a failure occurs in any of solenoid valves which control engagement operations of frictional elements such as clutches and brakes of the transmission. The hydraulic control system includes a hydraulic pressure flow control unit which controls hydraulic pressure flow between at least one of the frictional elements and at least one of the solenoid valves to allow the hydraulic pressure to be supplied to a predetermined combination of the frictional elements to achieve the power transmission at one of given gear ratios. The hydraulic pressure flow control unit restricts the hydraulic pressure flow to an inoperative combination of the frictional elements which provides no power transmission. With these arrangements, the power transmission is established if any of the solenoid valves malfunctions to allow the vehicle to travel.

4 Claims, 17 Drawing Sheets

FIG. 3

TABLE 1

| SHIFT POSITION | | C1 | C2 | B0 | B1 | B2 | B3 | C0 |
|---|---|---|---|---|---|---|---|---|
| P | | | | | | | | ○ |
| R | | | ○ | | | | ○ | ○ |
| N | | | | | | | | ○ |
| D | O/D | ○ | ○ | ○ | | ○ | | |
| | 3rd | ○ | ○ | | | ○ | | ○ |
| | 2nd | ○ | | | | ○ | | ○ |
| | 1st | ○ | | | | | | ○ |
| II | 3rd | ○ | ○ | | | ○ | | ○ |
| | 2nd | ○ | | | ○ | ○ | | ○ |
| | 1st | ○ | | | | | | ○ |
| L | 2nd | ○ | | | ○ | ○ | | ○ |
| | 1st | ○ | | | | | ○ | ○ |

○: ENGAGEMENT BY PRESSURE SUPPLY 5,681,241

AUTOMATIC TRANSMISSION FOR AUTOMOTIVE VEHICLES

BACKGROUND OF THE INVENTION

1. Technical Field

The present invention relates generally to a hydraulic control system for an automatic transmission of an automotive vehicle, and more particularly to an improved hydraulic control system which has a fail-safe function of preventing unsafe operation of an automatic transmission if a failure occurs in any of solenoid valves which control engagement operations of clutches and brakes of the transmission.

2. Background Art

Reference will be made to FIGS. 16 and 17 to describe a structure of a conventional automatic transmission system.

The shown automatic transmission system 1, as shown in FIG. 16, includes an automatic transmission 100 composed of a power train 200 and a hydraulic control system 300. The hydraulic control system 300 includes a hydraulic control circuit 11 and a plurality of solenoid valves 19 for modifying hydraulic pressures in clutches and brakes of the automatic transmission 100.

FIG. 17 shows a structure of the automatic transmission 100.

An input shaft 121 is connected to an output of a torque converter 122 and also connected to a ring gear 131 and a sun gear 132 of a front planetary gear set 13A through a forward clutch C1 and a direct clutch C2. A second coast brake B1 and a second brake B2 are mounted directly or through a one-way clutch F1 on the sun gear 132 which is used commonly in the front planetary gear set 13A and a rear planetary gear set 13B.

A middle shaft 133 connects a pinion 134 of the front planetary gear set 13A, a ring gear 135 of the rear planetary gear set 13B, and a pinion 136 of a counter planetary gear set 13C, and is connected to a counter shaft 137 through a one-way clutch F0 and an overdrive clutch C0 arranged in parallel. The counter shaft 137 has disposed thereon an overdrive brake B0. Mounted on a pinion 138 of the rear planetary gear set 13B are a one-way clutch F2 and a first and reverse brake B3. An output shaft 123 is connected to a ring gear 139 of the counter planetary gear set 13C.

The torque converter 122 has a lock-up clutch 124 which is actuated selectively by supply or discharge of hydraulic pressure to and from its front or rear hydraulic line.

A gear shift is achieved according to a position of a shift lever by supplying hydraulic pressure to the clutches C0 to C2 and the brakes B0 to B3 selected according to operational relations, as indicated by "O" in FIG. 3.

The above mentioned conventional transmission system is capable of realizing an optimum gear shift operation according to driving conditions of an automotive vehicle by controlling turning on and off of the solenoid valves using a controller having a microcomputer. A drawback is however encountered in that if the solenoid valves malfunction, for example, are stuck due to some contaminant, the gear shift operation is not achieved smoothly. In the worst case, it becomes impossible to drive the vehicle.

SUMMARY OF THE INVENTION

It is therefore a principal object of the present invention to avoid the disadvantages of the prior art.

It is another object of the present invention to provide an improved hydraulic control system for an automatic transmission which has a fail-safe function of preventing unsafe operation of the automatic transmission if a failure occurs in any of solenoid valves which control engagement operations of clutches and brakes of the transmission.

According to one aspect of the present invention, there is provided a hydraulic control system for an automatic transmission of a vehicle which includes a power train having a plurality of frictional elements which are selectively activated according to a pressure level of hydraulic pressure supplied thereto under a given operation schedule for establishing power transmission at one of preselected gear ratios, which comprises a pressure source for providing the hydraulic pressure at a given level, a hydraulic circuit connecting between the pressure source and the plurality of the frictional elements; a plurality of solenoid valves disposed in the hydraulic circuit, the solenoid valves selectively supplying the hydraulic pressure provided from the pressure source to the frictional elements; a hydraulic pressure flow control means disposed in the hydraulic circuit; and a valve controlling means for controlling operations of the solenoid valves. The hydraulic pressure flow control means controls hydraulic pressure flow between at least one of the frictional elements and at least one of the solenoid valves to allow the hydraulic pressure provided by the pressure source to be supplied to a first predetermined combination of the frictional elements to achieve the power transmission at one of the preselected gear ratios. The hydraulic pressure flow control means also restricts hydraulic pressure flow to a second combination of the frictional elements which provides no power transmission.

In the preferred mode of the invention, the hydraulic pressure flow control means supplies the hydraulic pressure outputted from the solenoid valves to a different combination of the frictional elements according to the given operation schedule.

A pressure regulator means may be further provided for reducing the hydraulic pressure supplied to the frictional elements to a preselected lower level for a given period of time upon engagement of the frictional elements.

The hydraulic pressure flow control means includes a plurality of mechanical directional control valves each having a pressure chamber on which the hydraulic pressure provided from the pressure source acts. Each of the mechanical directional control valves controls the hydraulic pressure flow between the at least one of the frictional elements and the at least one of the solenoid valves according to a pressure level of the hydraulic pressure acting on the pressure chamber.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 3 is a table 1 which represents operative relations between positions of a shift lever among the P, R, N, D, II, and L ranges and operative conditions of clutches and brakes of a power train;

DESCRIPTION OF THE PREFERRED EMBODIMENT

Figure 1:
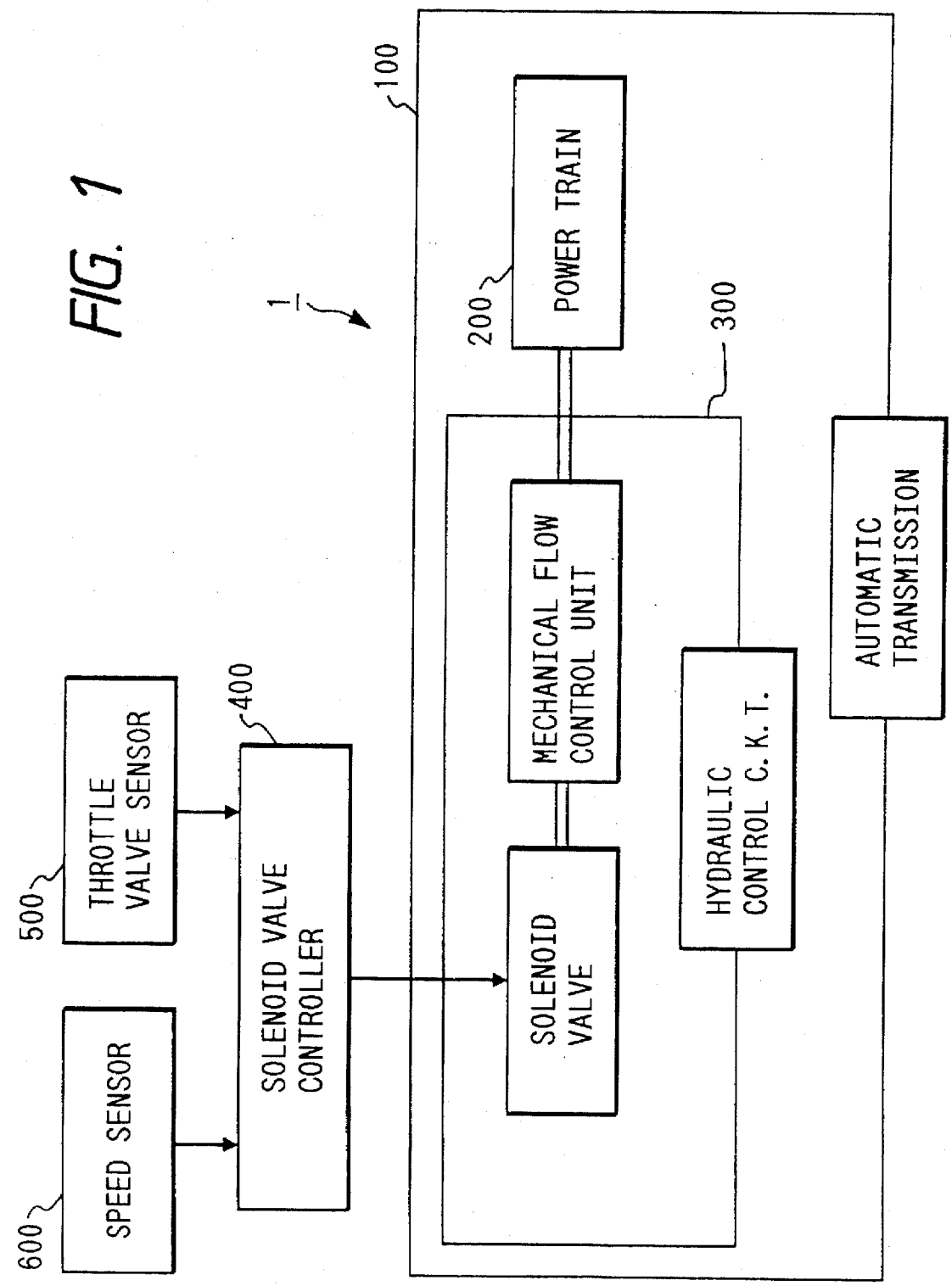
FIG. 1 is a block diagram which shows an automatic transmission system having a hydraulic control system according to the present invention.

Referring now to the drawings, wherein like numbers refer to like parts in several views, particularly to FIG. 1, there is shown an automatic transmission system 1 for automotive vehicles which includes an automatic transmission 100 composed of a power train 200 and a hydraulic control system 300. The power train 200, as will be explained hereinafter in detail, includes a gear train (e.g., a planetary gear set, etc.) and a plurality of frictional elements such as clutches and brakes which are constructed to engage and disengage upon supply and release of hydraulic pressure. These arrangements are already discussed in the introductory part of this application and well known in the art. The explanation thereof in detail will thus be omitted here. The hydraulic control system 300 is responsive to a control signal from a solenoid valve controller 400 to selectively supply and release hydraulic pressure to and from the power train 200 according to a given schedule based on a throttle valve opening degree and a vehicle speed monitored by a throttle valve sensor 500 and a speed sensor 600.

Figure 2:
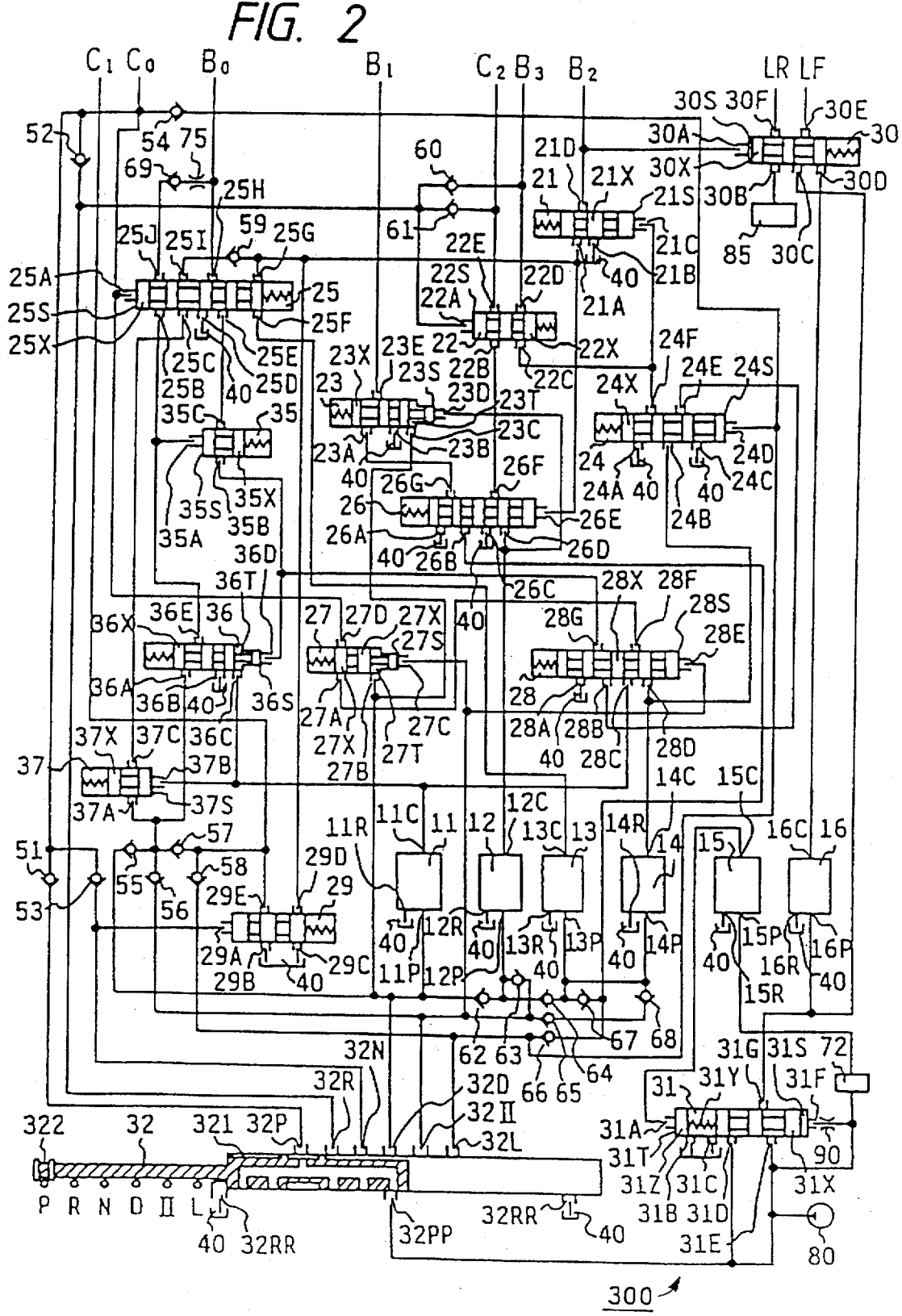
FIG. 2 is a hydraulic circuit diagram which shows a hydraulic control system for an automatic transmission.
Figure 17:
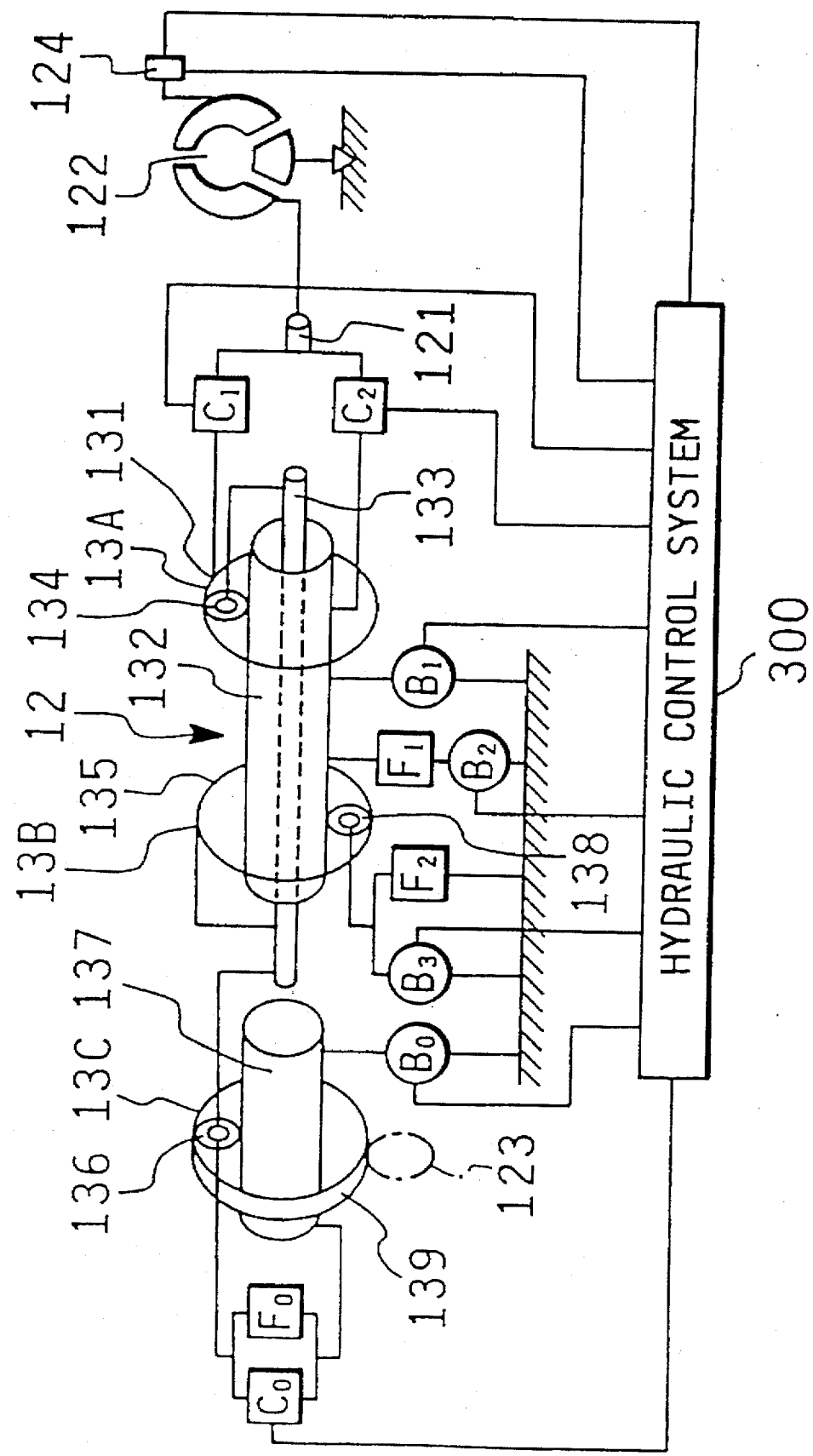
FIG. 17 is an illustration which shows a gear train of an automatic transmission.

FIG. 2 shows the hydraulic control system 300 which is disposed within a valve body VB of the automotive transmission system 1. The hydraulic control system 300 is connected to the power train 200 having the same typical structure as already mentioned in the introductory part of this specification with reference to FIG. 17, and description thereof in detail will be omitted here.

Internally, the hydraulic control system 300 includes solenoid valves 11, 12, 13, 14, 15, and 16, mechanical directional control valves 21, 22, 23, 24, 25, 26, 27, 28, 29, 35, 36, and 37, a lock-up control valve 30, a pressure regulator valve 31, a manual valve 32, and a number of check valves and filters.

The solenoid valves 11 to 16 include pressure ports 11P to 16P, control ports 11C to 16C, and return ports 11R to 16R, respectively. The pressure ports 11P to 16P each receive a line pressure supplied from the manual valve 32. The control ports 11C to 16C output the line pressure to the clutches and the brakes of the power train 200, respectively. The return ports 11R to 16R each communicate with a reservoir tank 40.

The manual valve 32 is operated by a shift lever (often called a selector lever), and includes a pressure port 32PP to which line pressure is supplied from an oil pump 80, a return port 32RR communicating with the reservoir tank 40, and a plurality of output ports 32P, 32R, 32N, 32D, 32II, and 32L for delivering the line pressure supplied through the pressure port 32PP according to a shift position of the shift lever. When a vehicle operator, or driver moves the shift lever to any one of P (Parking), R (Reverse), N (Neutral), D (Drive), II (first-to-third speed), and L (first-to-second speed) ranges, an end portion 322 of a spool 321 of the manual valve 32 is displaced to establish fluid communication between a corresponding one of the output ports 32P to 32L and the pressure port 32PP, while the other output ports communicate with the reservoir tank 40. For example, when the pressure port 32PP, as shown in FIG. 2, communicates with the output port 32P, all the output ports 32P, 32N, 32D, 32II, and 32L lead to the return port 32RR.

The output port 32P communicates with the overdrive clutch C0 of the power train 200 through a check valve 51. The output port 32R communicates with the overdrive clutch C0, the direct clutch C2, and the first and reverse brake B3 through check valves 52, 60, and 61, respectively. The output port 32N communicates with the overdrive clutch C0 through a check valve 53. The output port 32D communicates with the forward clutch C1 through check valves 55 and 57. The output port 32II communicates with the forward clutch C1 through a check valve 56. The output port 32L communicates with the overdrive clutch C0 and the forward clutch C1 through check valves 58 and 54.

The solenoid valve 11 has a pressure port 11P connected to the output port 32D of the manual valve 32 and a control port 11C connected to a port 28C of the directional control valve 28. The solenoid valve 12 has a pressure port 12P connected to both the output ports 32D and 32II of the manual valve 32 through check valves 62 and 63 and a control port 12C connected to a port 23D of the directional control valve 23 and a port 26D of the directional control valve 26.

The solenoid valve 13 has a pressure port 13P connected to the output ports 32D, 32II, and 32L of the manual valve 32 through check valves 64, 65, 66, and 67 and a control port 13C connected to a port 25F of the directional control valve 25.

The solenoid valve 14 has a pressure port 14P connected to the output ports 32D, 32II, and 32L of the manual valve 32 and a control port 14C connected to a port 28D of the directional control valve 28 and a port 24B of the directional control valve 24.

The solenoid valve 15 has a pressure port 15P connected to a discharge port of the oil pump 80 through a filter 72 and a control port 15C connected to a port 31A of the pressure regulator valve 31.

The solenoid valve 16 has a pressure port 16P communicating with a port 31G of the pressure regulator valve 31, a port 30C of the lock-up control valve 30. Its control port 16C communicates with a port 30D of the lock-up control valve 30.

The directional control valve 21 has ports 21A, 21B, 21C, and 21D. The port 21A communicates with port 26E, 25G, and 29D of the directional control valves 26, 25, and 29. The port 21B leads to the reservoir tank 40. The port 21C connects with ports 22C and 24F of the directional control valves 22 and 24. The port 21D communicates with a port 30A of the lock-up control valve 30 and the second brake B2. The directional control valve 21 is responsive to the line pressure applied to the port 21C to establish fluid communication between the port 21D and the port 21B while fluid communication between the ports 21D and 21A is achieved when no line pressure is developed at the port 21C.

The directional control valve 22 has a port 22A connected to the port 32R of the manual valve 32, to a port 22E through a check valve 61, and to a port 22D of a check valve 60. A port 22B is connected to the port 26F of the directional control valve 26. A port 22D is connected to the first and reverse brake B3. A port 22E is connected to the direct clutch C2. The directional control valve 22, when no line pressure is applied to the port 22A, establishes fluid communications between the port 22E and the port 22B and between the port 22D and the port 22C, while it blocks these fluid communications when the line pressure is applied to the port 22A.

The directional control valve 23 has a port 23A connected to a port 26G of the directional control valve 26, a port 23B connected to the reservoir tank 40, a port 23C connected to a port 27B a directional control valve 27 and the port 32D of the manual valve 32, and a port 23E connected to the second coast brake B1. A fluid communication is established between the port 23E and 23A when no line pressure is applied to the port 23C and no hydraulic pressure from the port 12C of the directional control valve 12 is applied to the port 23E. When either of these pressures exists, a fluid communication between the port 23E and the port 23B is achieved.

The directional control valve 24 has ports 24A and 24C connected to the reservoir tank 40, a port 24D connected to the port 32L of the manual valve 32, and a port 24E connected to a port 28B of the directional control valve 28, and establishes fluid communications between the port 24F and the port 24A and between the port 24E and the port 24B when no line pressure is applied to the port 24D, while fluid communications between the port 24F and the port 24B and between the port 24E and the port 24C when the line pressure is applied to the port 24D.

The directional control valve 25 has a port 25A connected to the overdrive clutch C0 and a port 27D of the directional control valve 27, a port 25B connected to the port 36E of the directional control valve 36 and the port 25A of the directional control valve 35, a port 25C connected to the port the port 37C of the directional control valve 37, a port 25D connected to the reservoir tank 40, a port 25E connected to the port 35C of the directional control valve 35, and a port 25H connected to the over drive brake B0. The directional control valve 25 further has a port 25I connected to the port 21A of the directional control valve 21 through a check valve 59 and a port 35J connected to the overdrive brake B0 through a check valve 69 and an orifice 57.

When the hydraulic pressure appears in the port 25A for supply to the overdrive clutch C0, fluid communications between the port 25F and the port 25G and between the port 25D and the port 25H are established while blocking fluid communications between the port 25J and the port 25B and between the port 25I and the port 25C. Alternatively, when there is no hydraulic pressure in the port 25A, fluid communications between the port 25I and the port 25C, between the port 25J and the port 25B, and between the port 25H and the port 25E are established while blocking the fluid communication between the port 25F and the port 25H.

The directional control vale 26 has ports 26A and 26C connected to the reservoir tank 40 and a port 26B connected to the ports 32II and 32L of the manual valve 32. The directional control valve 26 normally establishes fluid communications between the port 26F and the port 26C and between 26G and the port 26A. When the line pressure is applied to the port 26E, fluid communication between the port 26F and the port 26D is established.

The directional control valve 27 has a port 27A connected to a port 28F of the directional control valve 28, a port 27B connected to the port 32D of the manual valve 32, and a port 27C connected to the port 32II of the manual valve 32. When no hydraulic pressure is applied to the port 27B or the port 27C, the directional control valve 27 blocks fluid communication between the port 27D and the port 27A, while when the line pressure is applied to the port 27B or the port 27C, the fluid communication between the port 27D and the port 27A is established.

The directional control valve 28 has a port 28E connected to the port 32II of the manual valve 32, a port 28G connected to the port 35 of the directional control valve 35 and the port 36D of the directional control valve 36, and a port 28A connected to the reservoir tank 40. When no line pressure is applied to the port 28E, fluid communications between the port 28F and the port 28C and between the port 28G and the port 28B are established. Alternatively, when the line pressure is applied to the port 28E, fluid communications between the port 28G and the port 28A and between the port 28F and the port 28D are established.

The directional control valve 29 has a port 29A connected to the port 32N of the manual valve 32, ports 29B and 29C connected to the reservoir tank 40, and a port 29E connected to the forward clutch C1. When no line pressure is applied to the port 29A, fluid communications between the port 29E and the port 29B and between the port 29D and the port 29C are blocked, while these fluid communications are established when the line pressure appears at the port 29A.

The directional control valve 35 establishes a fluid communication between the port 35C and the port 35B when no hydraulic pressure is applied to the port 35A, while this communication is blocked when the hydraulic pressure is applied to the port 35A.

The port 36A of the directional control valve 36 communicates with the port 32II of the manual valve 32 and the port 37A of the directional control valve 37. The port 36B communicates with the reservoir tank 40. When no hydraulic pressure is applied to the port 36C or the port 36D, the fluid communication between the port 36E and the port 36A is established, while the hydraulic pressure is applied thereto, the fluid communication between the port 36E and the port 36B is achieved.

The directional control valve 37 establishes the fluid communication between the port 37C and the port 37A when no hydraulic pressure is applied to the port 37B, while this communication is blocked when the hydraulic pressure is applied to the port 37B.

The lock-up control valve 30 has a port 30B connected to an oil cooler 85, a port 30E connected to a front hydraulic line LF of the lock-up clutch LC, and a port 30F connected to a rear hydraulic line LR of the lock-up clutch LC. When no hydraulic pressure is applied to the port 30A, fluid communications between the port 30E and the port 30C and between the port 30F and the port 30B are established. When the hydraulic pressure is applied to the port 30A, fluid communications between the port 30E and the port 30D and among the port C, the port 30F, and the port 30B are established.

The pressure regulator valve 31 has ports 31B and 31C connected to the reservoir tank 40, a port 31D connected to both the discharge port of the oil pump 80 and the pressure port 32PP of the manual valve 32, a port 31E connected to the discharge port of the oil pump 80, and a port 31F connected to the discharge port of the oil pump 80 through a throttle or orifice 90. The pressure regulator valve 31 is designed to control the degree of hydraulic pressure at the ports 31D, 31E, and 31G according to a pressure level applied to the ports 31A and 31F.

FIG. 3 shows a Table 1 representing operative relations between positions of the shift lever among the P, R, N, D, II, and L ranges, and operative conditions of the frictional elements (i.e., clutches and brakes C0, C1, C2, B0, B1, and B3) of the power train 200. As seen from the Table 1, when the driver shifts the shift lever to a desired range, a preselected gear ratio is established by controlling engagement and disengagement of the clutches and the brakes C0, C1, C2, B0, B1, and B3 under activities of the solenoid valves 11 to 16.

An operation of the hydraulic control system 300 for controlling the clutches and the brakes of the power train 200 will be described below.

Initially, the oil pump 80 disposed within a housing of the automatic transmission is activated to provide a line pressure to the hydraulic control system 300. The line pressure is then regulated by the pressure regulator valve 31 in the following manner. As the hydraulic pressure discharged from the oil pump 80 is elevated, the pressure in a pressure chamber 31S defined in the left end of the pressure regulator valve 31 is increased to move a spool 31X in the left direction, as viewed in the drawing, until the pressure in the pressure chamber 31S balances with a spring force of a spring 31Y. When the pressure in the pressure chamber 31S is further elevated to move the spool 31X in the left direction, it will cause the hydraulic pressure inputted to the port 31D to be directed to the reservoir tank 40 through the port 31C. This results in decreased line pressure, thereby causing the spool 31X to be displaced right to block fluid communication between the port 31D and the port 31C. The regulation of the line pressure to a preselected set pressure is achieved by repeating the above process.

The line pressure is also modified by the solenoid valve 15. When the solenoid valve 15 is energized to establish fluid communication between the pressure port 15P and the control port 15C for elevating a pressure level in a pressure chamber 31T defined in the left end of the pressure regulator valve 31, it will cause a land 31Z to move in a right direction, thereby compressing the spring 31Y to displace the spool 31X. Thus, the hydraulic pressure in the pressure chamber 31S serving to establish the fluid communication between the ports 31D and 31C to direct the line pressure to the reservoir tank 40, is elevated to a level higher than that as described above, so that the line pressure is further increased.

Conversely, when the solenoid valve 15 is turned off to connect the control port 15C to the return port 15R, the pressure in the pressure chamber 31T is decreased, thereby establishing the fluid communication between the port 31D and the port 31C easily even when the pressure in the pressure chamber 31S is low, so that the line pressure is set lower. The higher line pressure is provided when it is required to supply the line pressure to the clutches quickly, while the lower line pressure is provided when it is required to reduce mechanical shocks upon engagement of the clutches.

The line pressure supplied from the oil pump 80 regulated in pressure level by the pressure regulator valve 31 and the solenoid valve 15, as shown in FIG. 2, enters the pressure port 32PP of the manual valve 32, and then is directed to any one of the output ports 32P, 32R, 32N, 32D, 32II, and 32L according to a valve position of the manual valve 32. For example, when the shift lever lies in the P range, the pressure port 32PP communicates with the output port 32P. In the R range, the pressure port 32PP communicates with the output port 32R. In the N range, the pressure port 32PP communicates with the output port 32N. In the D range, the pressure port 32PP communicates with the output port 32D. In the II range, the pressure port 32PP communicates with the output port 32II. In the L range, the pressure port 32PP communicates with the output port 32L.

P Range

Figure 4:
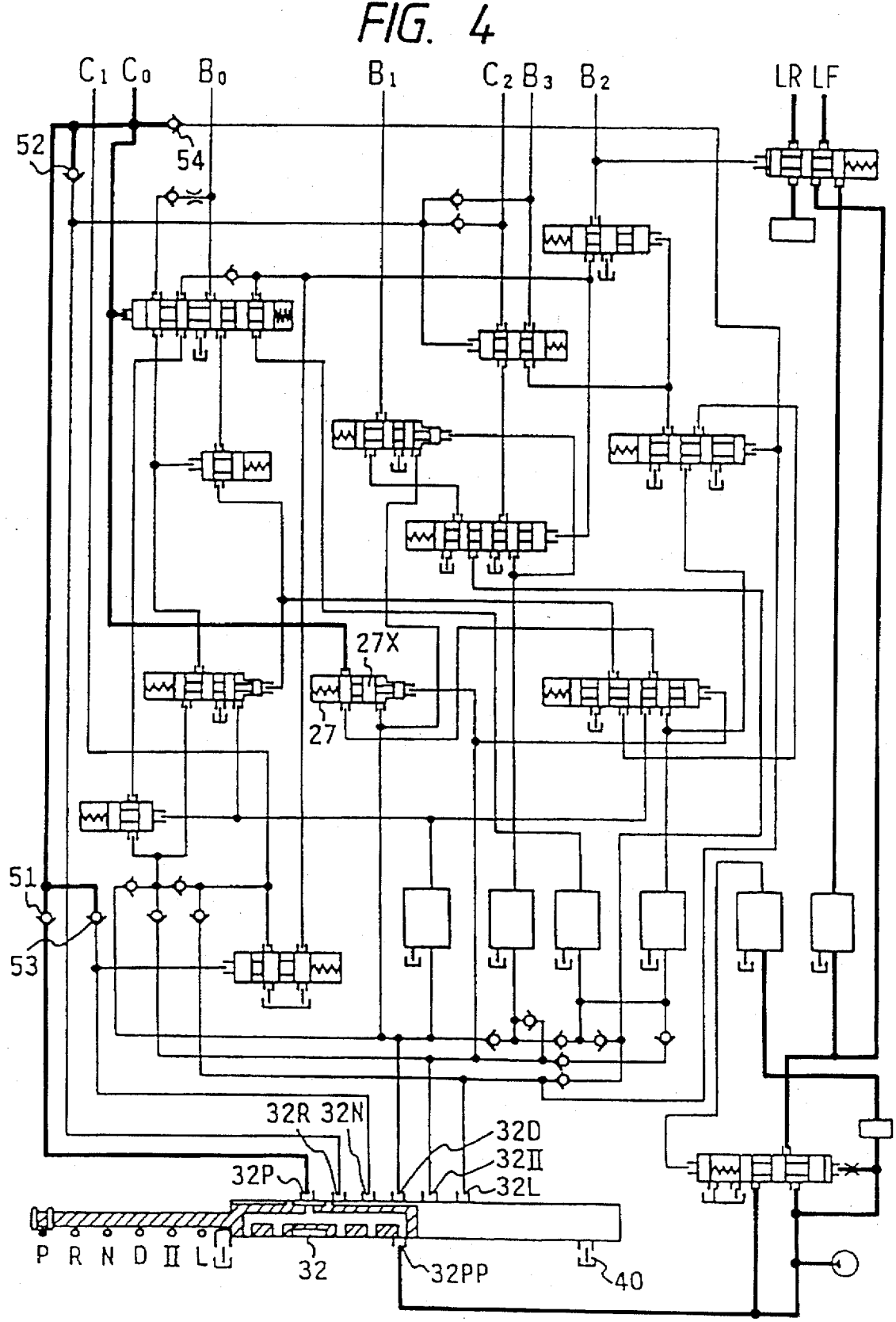
FIG. 4 is a hydraulic circuit diagram which shows the flow of hydraulic pressure in a parking mode of transmission operation.

Referring to FIG. 4, thick lines show the flow of hydraulic pressure in the P range (parking mode).

When a driver shifts the shift lever to within the P range, the hydraulic pressure is supplied from the output port 32P of the manual valve 32 to the overdrive clutch C0 through the check valve 51 to achieve a parking mode of transmission operation. The activities of the check valves 52, 53, and 54 and the spool 27X of the directional control valve 27 inhibit the hydraulic pressure from being directed to other elements and the reservoir tank 40. In the P range, the output ports 32R, 32N, 32D, 32II, and 32L other than the output port 32P all communicate with the reservoir tank 40, so that the hydraulic pressure acts on the clutch C0 only.

R Range

Figure 5:
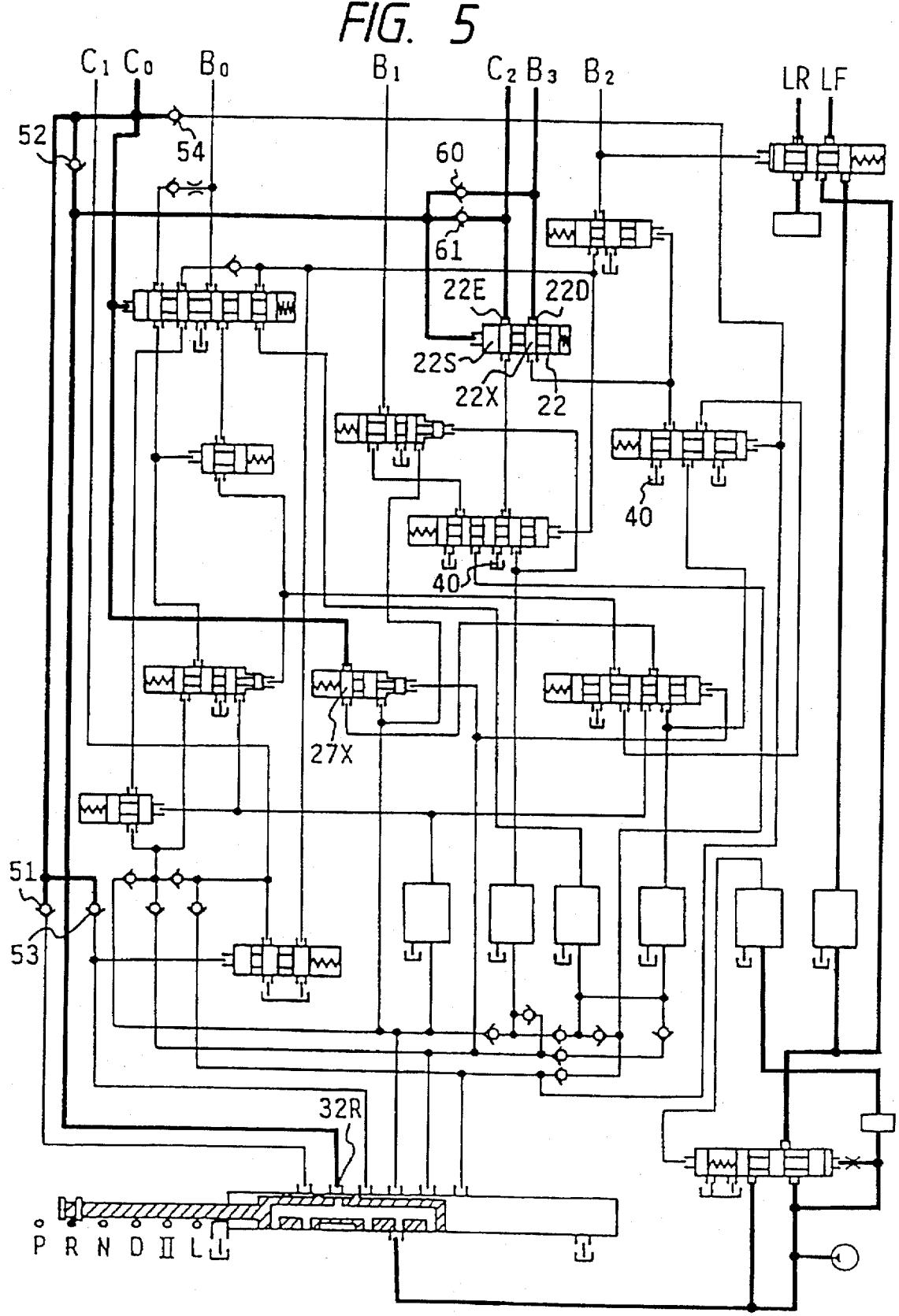
FIG. 5 is a hydraulic circuit diagram which shows the flow of hydraulic pressure in a reverse mode of transmission operation.

Referring to FIG. 5, there is shown the flow of hydraulic pressure in the R range.

When the driver shifts the shift lever to the R range, the hydraulic pressure is supplied from the output port 32R of the manual valve 32 to act on the overdrive clutch C0 through the check valve 52, and also acts on both the first and reverse brake B3 through the check valve 60 and the direct clutch C2 through the check valve 61. Additionally, the hydraulic pressure reaches the pressure chamber 22S of the directional control valve 22 so that it urges the spool 22X in the right direction to block the ports 22D and 22E, thereby restricting the hydraulic pressure acting on the direct clutch C2 and the first and reverse brake B3 from being returned back to the reservoir tank 40. The activities of the check valves 54, 51, and 53 and spool 27X of the directional control valve 27 prevent the hydraulic pressure from being directed to other elements and the reservoir tank 40. Therefore, the hydraulic pressure provided from the output port 32R of the manual valve 32 act on only the clutches C0 and C2 and the brake B3 to establish a reverse mode of transmission operation.

N Range

Figure 6:
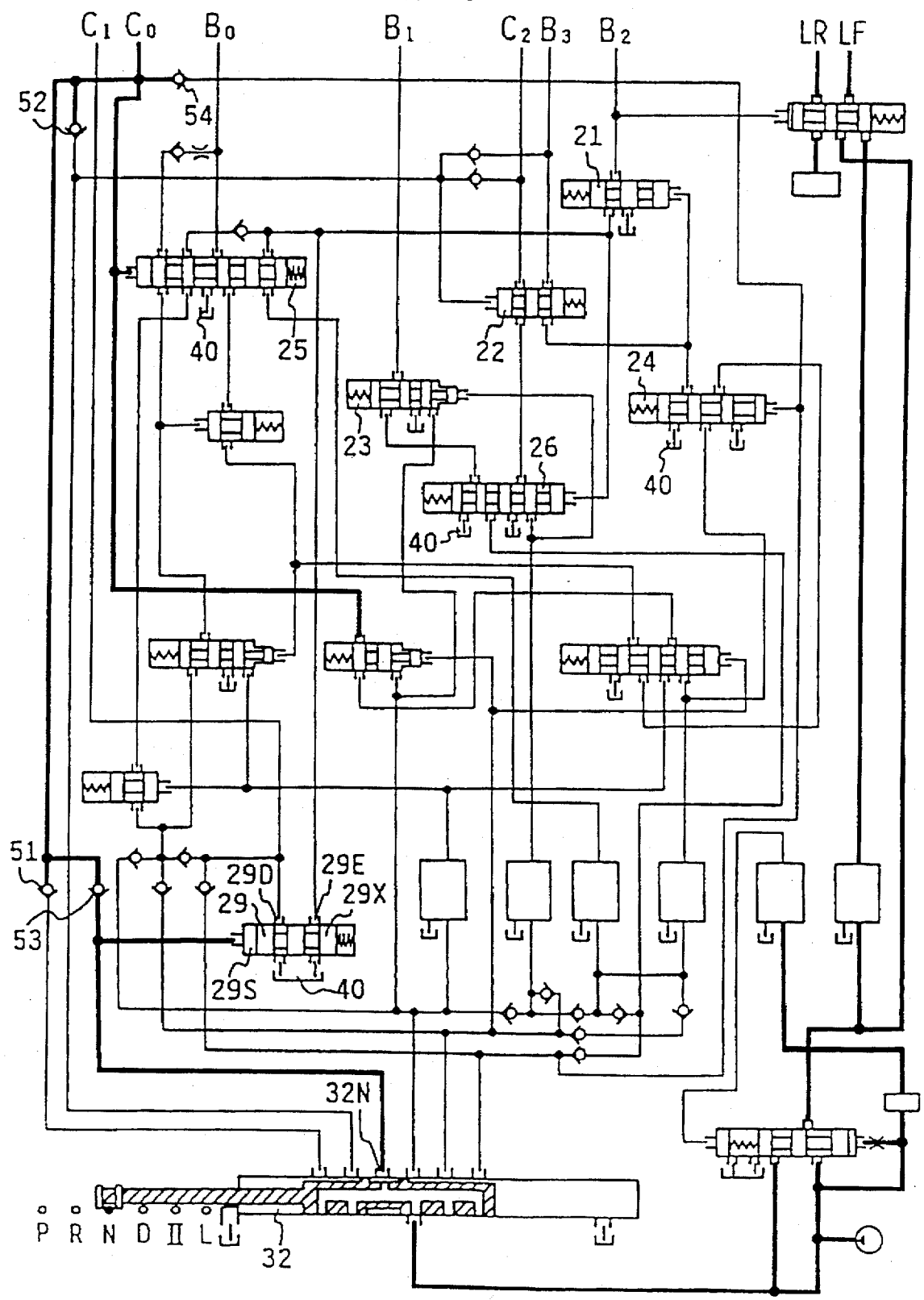
FIG. 6 is a hydraulic circuit diagram which shows the flow of hydraulic pressure in a neutral mode of transmission operation.

Referring to FIG. 6, there is shown the flow of hydraulic pressure in the N range.

When the driver shifts the shift lever to the N range, the hydraulic pressure is outputted from the output port 32N of the manual valve 32 and then acts on the overdrive clutch C0 through the check valve 53. It also reaches the pressure chamber 29S of the directional control valve 29 to urge the spool 29X in the right direction so that the ports 29D and 29E communicates with the reservoir tank 40, thereby causing the hydraulic pressure in the forward clutch C1 to be drawn into the reservoir tank 40. Additionally, the hydraulic pressure in the overdrive brake B0 is released to the reservoir tank 40 through the directional control valve 25. The hydraulic pressure in the first and reverse brake B3 is also released to the reservoir tank 40 through the directional control valves 22 and 24. Thus, only the overdrive clutch C0 is actuated to establish a neutral mode of transmission operation.

1st Mode (D-1) in D Range

Figure 7:
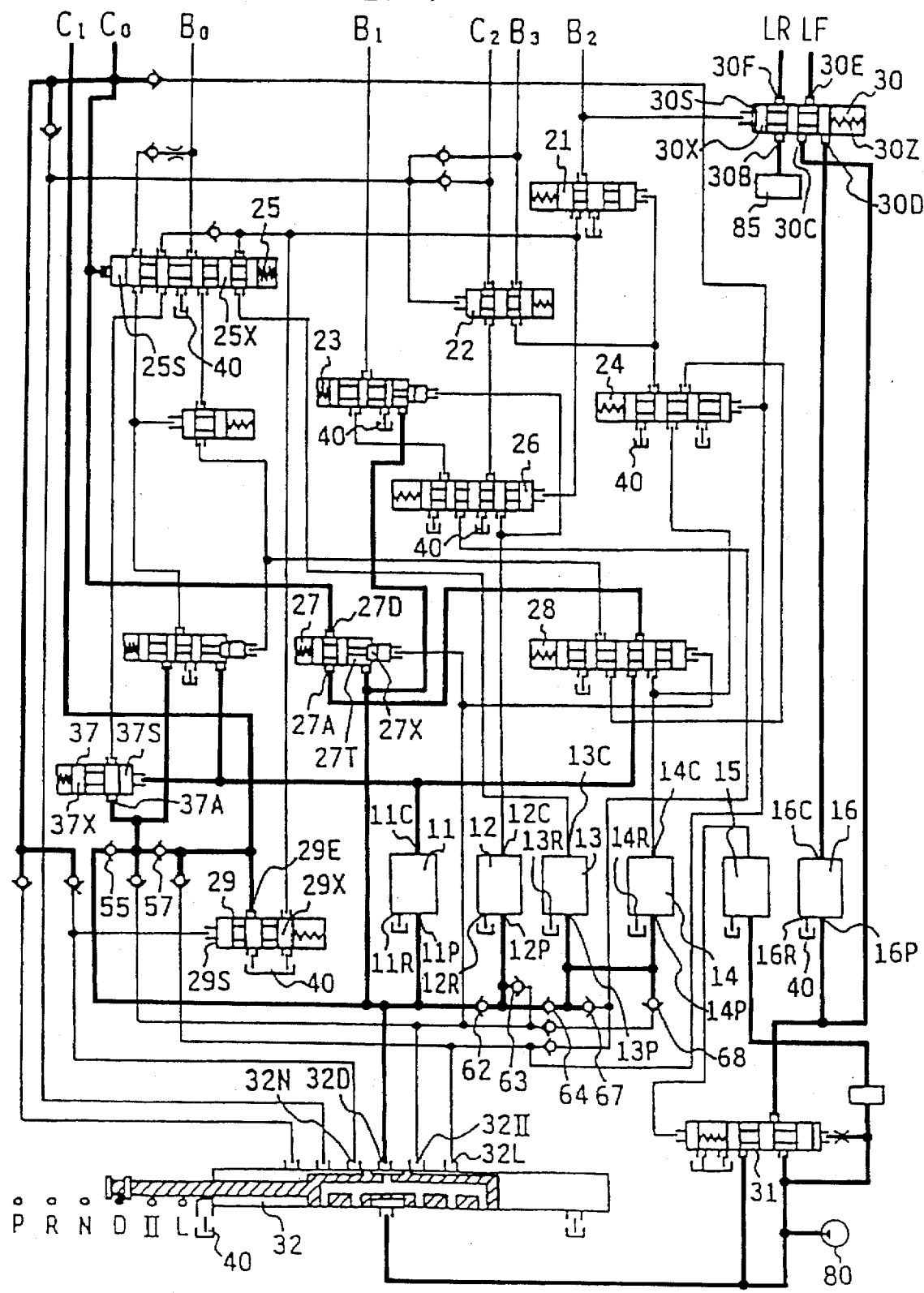
FIG. 7 is a hydraulic circuit diagram which shows the flow of hydraulic pressure in a 1st mode of a drive range.

Referring to FIG. 7, there is shown the flow of hydraulic pressure in a 1st (D-1) mode for establishing 1st speed in the D range. When the driver shifts the shift lever to the D range and it is required to establish the 1st speed according to the given operation schedule, the hydraulic pressure is initially outputted from the output port 32D of the manual valve 32, as shown by a thick line, and acts on the forward clutch C1 through the check valves 55 and 57. Upon movement of the shift lever to the D range, the hydraulic pressure in the pressure chamber 29S of the directional control valve 29 is released to the reservoir tank 40 through the output port 32N of the manual valve 32 to displace the spool 29X to the leftmost position, thereby blocking the port 29E for restricting hydraulic fluid in the forward clutch C1 from flowing into the reservoir tank 40. The engagement of the forward clutch C1 is, as described above, fine adjusted by turning off the solenoid valve 15 for a given period of time to reduce the line pressure to a preselected lower level temporarily for absorbing a shift shock which would make vehicle occupants feel uncomfortable.

The line pressure from the output port 32D is also supplied to the pressure port 11P of the solenoid valve 11, to the pressure port 12P of the solenoid valve 12 through the check valve 62, and to the pressure port 13P of the solenoid valve 13 through the check valve 64. The check valves 63, 67, and 68 serve to block the flow of the line pressure to the output ports 32II and 32L of the manual valve 32.

In the D-1 mode, the normally-closed solenoid valve 11 is energized to establish fluid communication between the pressure port 11P and the control port 11C. In addition, the normally-open solenoid valves 12, 13, and 14 are also energized to establish fluid communications between the control port 12C and the return port 12R, between the control port 13C and the return port 13R, and between the control port 14C and the return port 14R. Therefore, the line pressure from the output port 32D of the manual valve 32 passes through the solenoid valve 11 and the directional control valve 28 and then reaches the port 27A of the directional control valve 27. This line pressure is also introduced into the pressure chamber 27T of the directional control valve 27 to displace the spool 27X for achieving fluid communication between the ports 27A and 27D, so that the hydraulic pressure reaching the port 27A is directed to the overdrive clutch C0.

The solenoid valve 11 is duty cycle-controlled by the solenoid valve controller 400, as shown in FIG. 1, so as to repeat opening and closing operations with a preselected timing for smooth engagement of the overdrive clutch C0.

The line pressure from the output port 32D of the manual valve 32, as can be seen in the drawing, also reaches the port 37A of the directional control valve 37 through the check valve 55, however, it is blocked since the line pressure from the output port 32D acts on the pressure chamber 37S of the directional control valve 37 to urge the spool 37X in the right direction, closing the port 37A. Further, the pressure in the second coast brake B0 flows into the reservoir tank 40 through the directional control valve 25. The pressure in the direct clutch C2 flows into the reservoir tank 40 through the directional control valves 22 and 26. The pressure in the second brake B2 flows into the reservoir tank 40 through the directional control valves 21 and 25 and the solenoid valve 13. The pressure in the first and reverse brake B3 flows into the reservoir tank 40 through the directional control valves 22 and 24. Accordingly, the line pressure provided through the manual valve 32 acts on only the forward clutch C1 and the overdrive clutch C0 to establish the D-1 mode.

2nd Mode (D-2) in D Range

Figure 8:
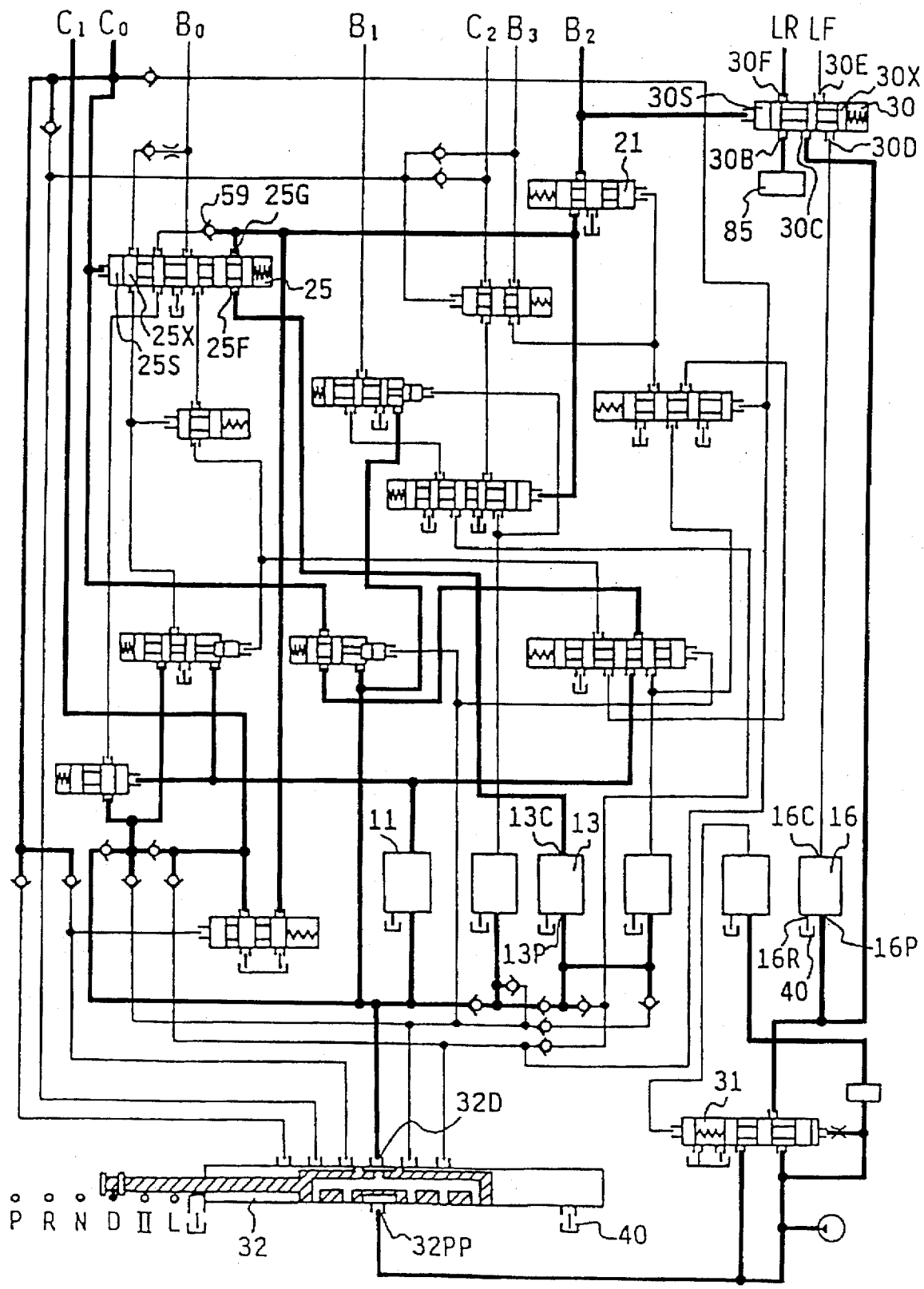
FIG. 8 is a hydraulic circuit diagram which shows the flow of hydraulic pressure in a 2nd mode of a drive range.

Referring to FIG. 8, there is shown the flow of hydraulic pressure in a 2nd (D-2) mode for establishing 2nd speed in the D range. The D-2 mode is different from the D-1 mode only in that the normally-open solenoid valve 13 is turned off to establish fluid communication between the pressure port 13P and the control port 13C, and other operations, or hydraulic flow is identical. Thus, an attempt is made here to describe the hydraulic flow from the control port 13C of the solenoid valve 13

When the solenoid valve 13 is deenergized, the line pressure is supplied from the control port 13C to the port 25F of the directional control valve 25. To the pressure chamber 25S of the directional control valve 25, the line pressure supplied from the solenoid valve 11 is introduced to urge the spool 25X in the right direction, fluid communication between the ports 25F and 25G being thereby established to direct the hydraulic pressure entering the port 25F to the second brake B2 through the directional control valve 21. The check valve 59 holds the line pressure from flowing to the other ports. The solenoid valve 13 is, likewise to the solenoid valve 11, duty cycle-controlled so as to elevate the hydraulic pressure acting on the second brake B2 gradually for achieving smooth engagement thereof. In the above manner, the clutches C1 and C0 and the brake B2 are activated to establish the D-2 mode.

3rd Mode (D-3) in D Range

Figure 9:
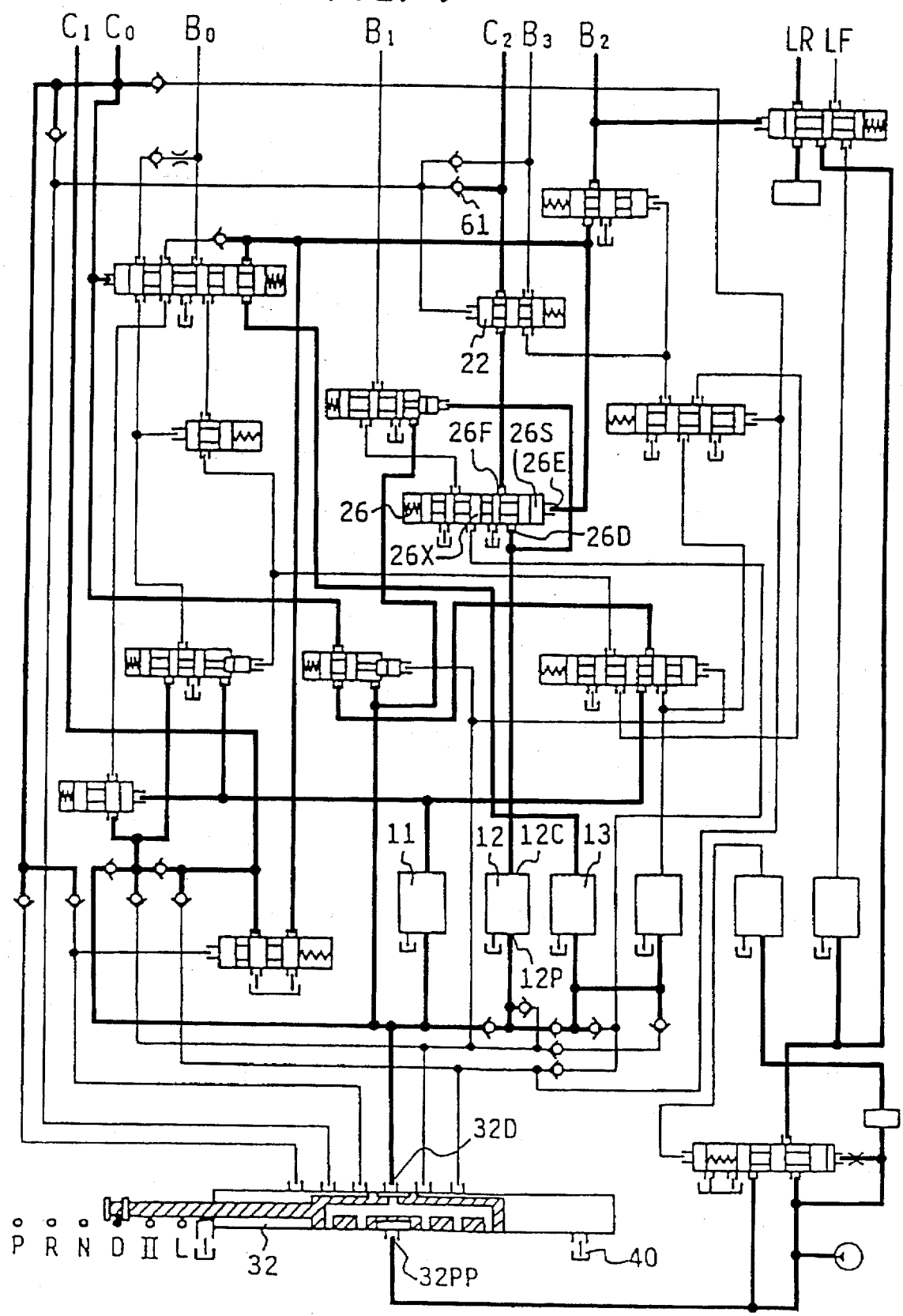
FIG. 9 is a hydraulic circuit diagram which shows the flow of hydraulic pressure in a 3rd mode of a drive range.

Referring to FIG. 9, there is shown the flow of hydraulic pressure in a 3rd (D-3) mode for establishing 3rd speed in the D range. The D-3 mode is different from the D-2 mode only in that the normally-open solenoid valve 12 is turned off to establish fluid communication between the pressure port 12P and the control port 12C, and other operations, or hydraulic flow is identical.

When the solenoid valve 12 is turned off, the control port 12C provides the line pressure to the port 26D of the directional control valve 26. To the pressure chamber 26S of the directional control valve 26, the hydraulic pressure is supplied from the solenoid valve 13 to bias the spool 26X in the left direction, thereby establishing fluid communication between the ports 26D and 26F to direct the hydraulic pressure entering the port 26D to the direct clutch C2 through the directional control valve 22. The check valve 61 prevents the hydraulic pressure outputted from the directional control valve 22 from being directed to the other ports. The solenoid valve 12 is, likewise to the solenoid valves 11 and 13, duty cycle-controlled (i.e., turned on and off) so as to gradually elevate the hydraulic pressure acting on the direct clutch C2 at a preselected rate for achieving smooth engagement thereof. In the above manner, the clutches C1, C0, and C2 and the brake B2 are activated to establish the D-3 mode.

Overdrive (O/D) Mode in D Range

Figure 10:
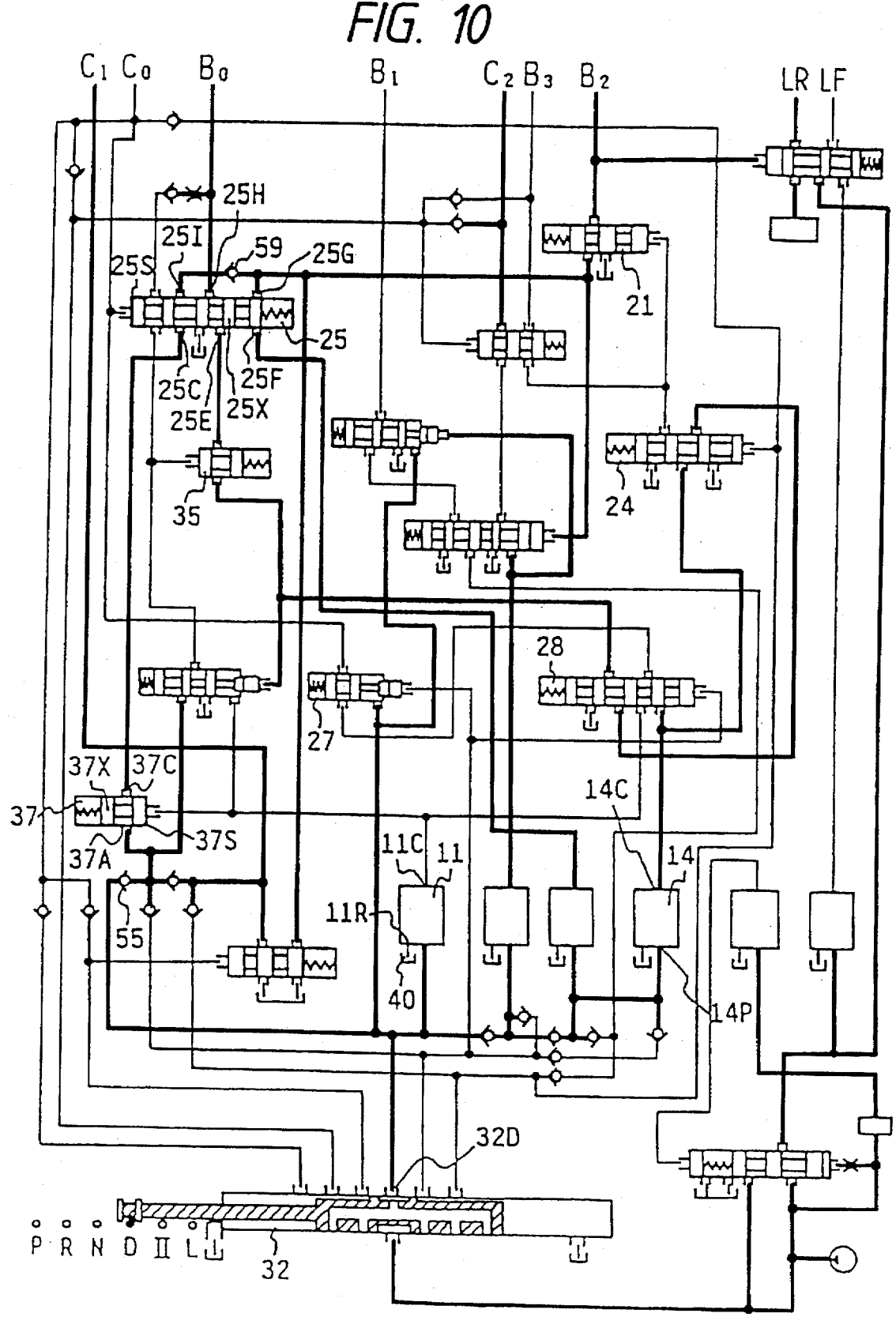
FIG. 10 is a hydraulic circuit diagram which shows the flow of hydraulic pressure in an overdrive mode of a drive range.

Referring to FIG. 10, there is shown the flow of hydraulic pressure in an overdrive (O/D) mode for establishing overdrive speed in the D range. The O/D mode is different from the D-3 mode only in that the normally-closed solenoid valve 11 is turned off to establish fluid communication between the control port 11C and the return port 11R, while the normally-open solenoid 14 is turned on to establish fluid communication between the pressure port 14P and the control port 14C.

When the solenoid valve 11 is turned off, it will cause the hydraulic pressure acting on the overdrive clutch C0 to be released to the reservoir tank 40 through the directional control valves 27 and 28 and the control port 11C and the return port 11R of the solenoid valve 11. As a result, the hydraulic pressure in the pressure chamber 25S of the directional control valve 25 is also released to the reservoir tank 40 so that the spool 25X moves in the left direction, causing the ports 25C and 25E to communicate with the port 25I and 25H, while blocking the port 25F. The pressure in the pressure chamber 37S of the directional control valve 37 is released to the reservoir tank 40. This causes the spool 37X to be shifted to right to connect the port 37A with the port 37C so that the hydraulic pressure outputted from the pressure port 32D of the manual valve 32 reaches the second brake B2 through the check valve 55, the directional control valves 37 and 25, the check valve 59, and the directional control valve 21. Additionally, the hydraulic pressure outputted from the control port 14C of the solenoid 14 reaches the overdrive brake B0 passing through the directional control valves 24, 28, 35, and 25. The above hydraulic flow activates the clutches C1 and C2 and brakes B0 and B2 to establish the O/D mode.

1st Mode (II-1) in II Range

Figure 11:
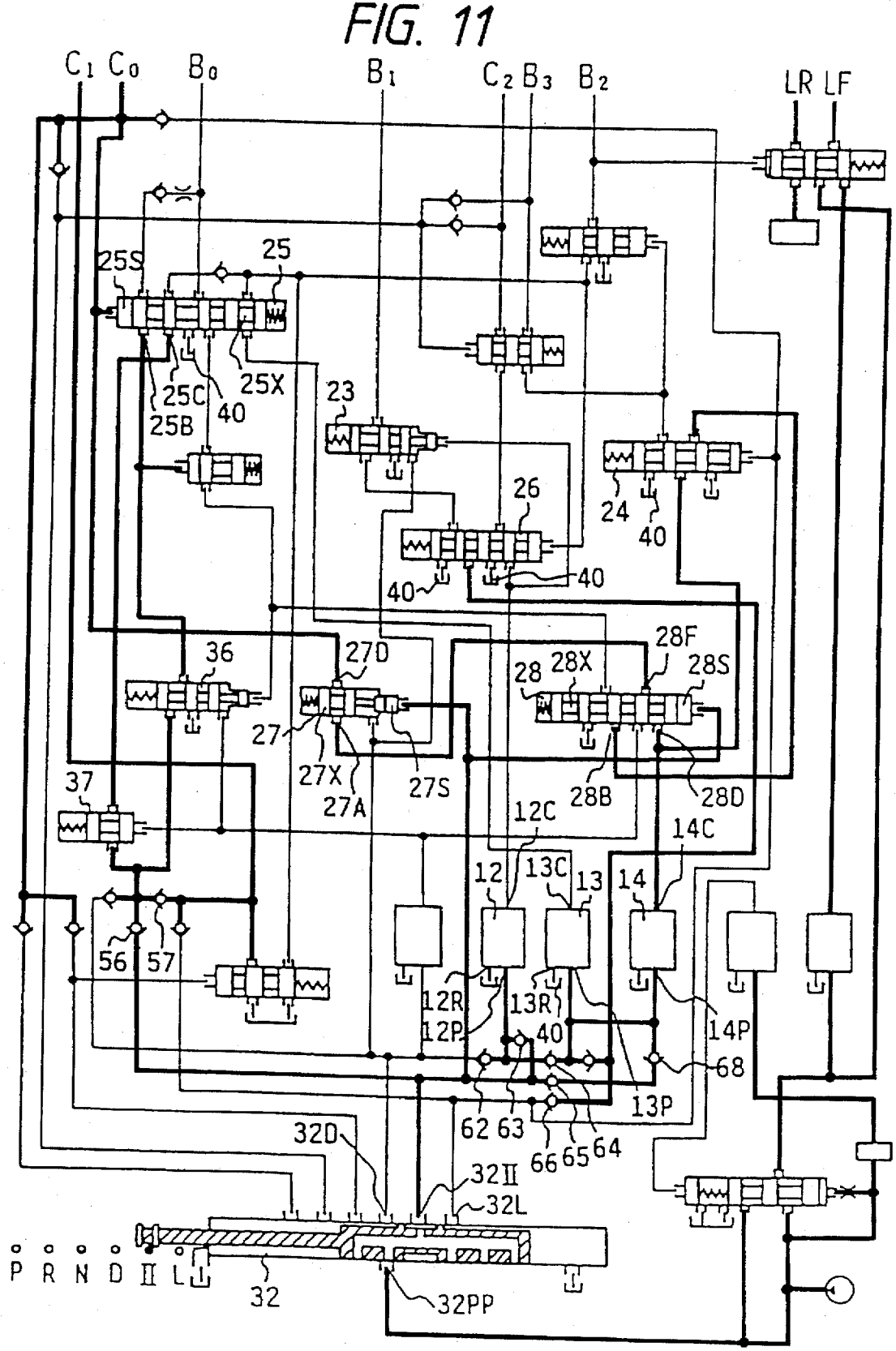
FIG. 11 is a hydraulic circuit diagram which shows the flow of hydraulic pressure in a 1st mode of a II range.

Referring to FIG. 11, there is shown the flow of hydraulic pressure in a 1st (II-1) mode for establishing 1st speed in the II range.

When the shift lever is shifted to the II range, the manual valve 32 establishes fluid communication between the pressure port 32PP and the output port 32II to provide the line pressure to the forward clutch C1 through the check valves 56 and 57. The line pressure also acts on the pressure port 14P of the solenoid valve 14 through the check valve 63, on the pressure port 13P of the solenoid 13 through the check valve 64, and on the pressure port 14P of the solenoid 14 through the check valves 65 and 68. The check valves 62 and 66 serve to block the flow of the hydraulic pressure back to the output ports 32D and 32L of the manual valve 32.

When it is required to establish the 1st speed in the II range, the normally-open solenoid valves 12 and 13 are turned on to establish fluid communications between the control port 12C and the return port 12R and between the control port 13C and the return port 13R. Additionally, the normally-open solenoid valve 14 is turned off to establish fluid communication between the pressure port 14P and the control port 14C. Thus, the line pressure is supplied to the port 28D of the directional control valve 28 through the solenoid valve 14.

The line pressure from the output port 32II of the manual valve 32 also acts on both the pressure chambers 28S and 27S of the directional control valves 28 and 27 to displace the spools 28X and 27X to the left position for establishing fluid communications between the ports 28D and 28F and between the ports 27A and 27D, respectively. Thus, the line pressure reaching the port 28D of the directional control valve 28 is supplied to the overdrive clutch C0. The hydraulic pressure outputted from the port 14C of the solenoid valve 14 passes through the directional control valve 24 to reach the port 28B of the directional control valve 28 and is then blocked.

Additionally, the line pressure is also delivered to the port 25C of the directional control valve 25 through the check valve 56 and to the port 25B of the directional control valve 25 through the directional control valve 36, however, it is blocked here since the hydraulic pressure is developed in the pressure chamber 25C of the directional control valve 25 to displace the spool 25X to the right to block the ports 25C and 25B. The hydraulic pressures activating the brakes B0, B2, and B3 and the clutch C2 are, similar to the D-1 mode, released to the reservoir tank 40. Further, the hydraulic pressure in the brake B1 is also released to the reservoir tank 40 through the directional control valves 23 and 26. Accordingly, the forward clutch C1 and the overdrive clutch C0 are actuated to establish the II-1 mode in the II range.

2nd Mode (II-2) in II Range

Figure 12:
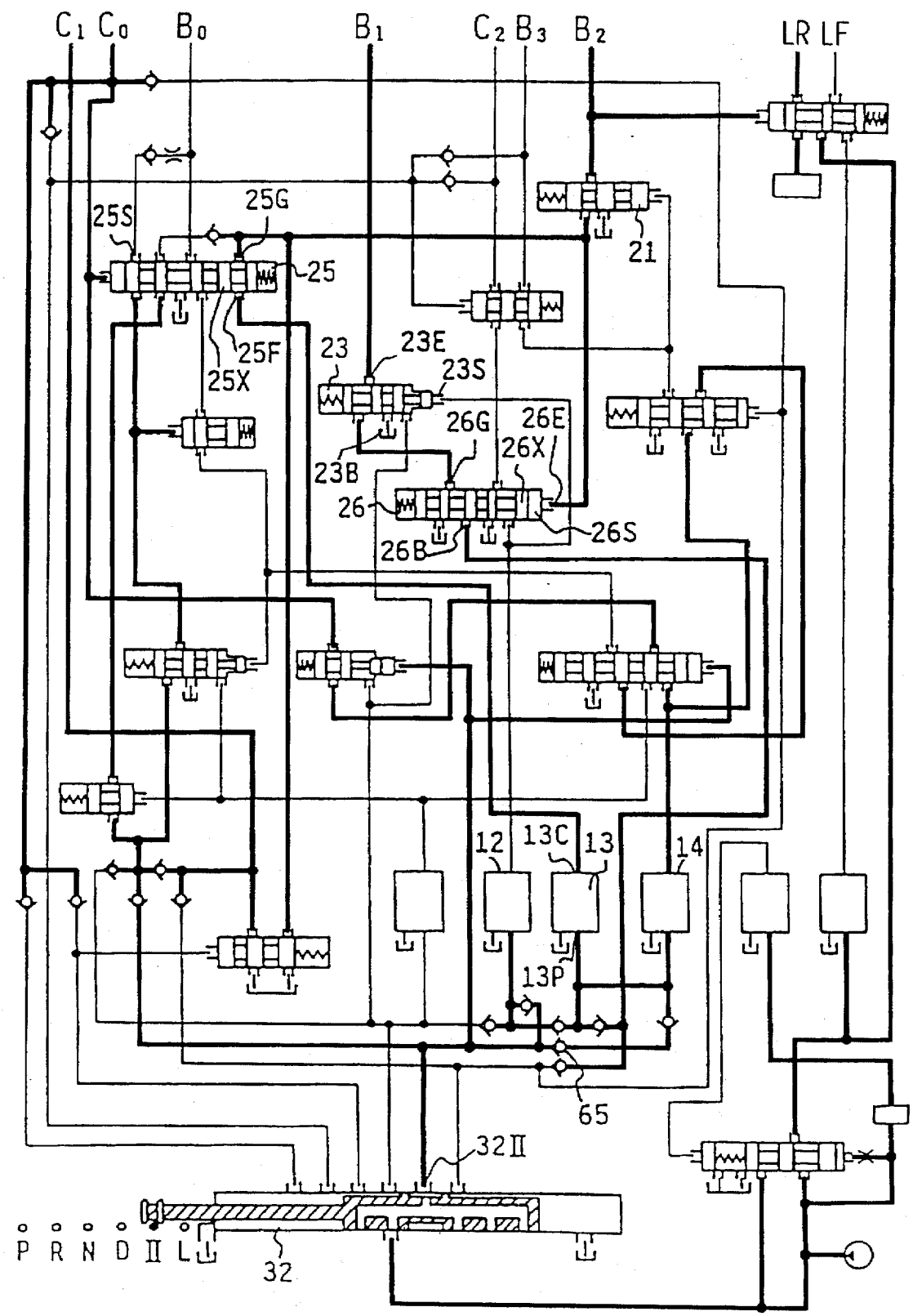
FIG. 12 is a hydraulic circuit diagram which shows the flow of hydraulic pressure in a 2nd mode of a II range.

Referring to FIG. 12, there is shown the flow of hydraulic pressure in a 2nd (II-2) mode for establishing 2nd speed in the II range.

The II-2 mode is different from the II-1 mode only in that the normally-open solenoid valve 13 is turned off to fluidly connect the pressure port 13P with the control port 13C, and other operations or hydraulic flow is identical.

When it is required to establish 2nd speed in the II range, the solenoid valve controller 400 turns off the solenoid valve 13 to provide the line pressure to the port 25F of the directional control valve 25. The directional control valve 25 is in a position to establish fluid communication between the ports 25F and 25G since the pressure in the pressure chamber 25S is raised to bias the spool 25X in the right direction. The line pressure reaching the port 25F is thus supplied to the second brake B2 through the directional control valves 25 and 21. Additionally, the line pressure outputted from the directional control valve 25 also reaches the port 26E of the directional control valve 26 to elevate the pressure in the pressure chamber 26S to displace the spool 26X to the left so that the port 26B communicates with the port 26G. The line pressure reaching the port 26B outputted from the manual valve 32 through the check valve 65 is thus supplied to the second coast brake B1 through the directional control valves 26 and 23. In this manner, the forward clutch C1, the overdrive clutch C0, the second coast brake B1, and the second brake B2 are actuated to establish the II-2 mode in the II range.

3rd Mode (II-3) in II Range

Figure 13:
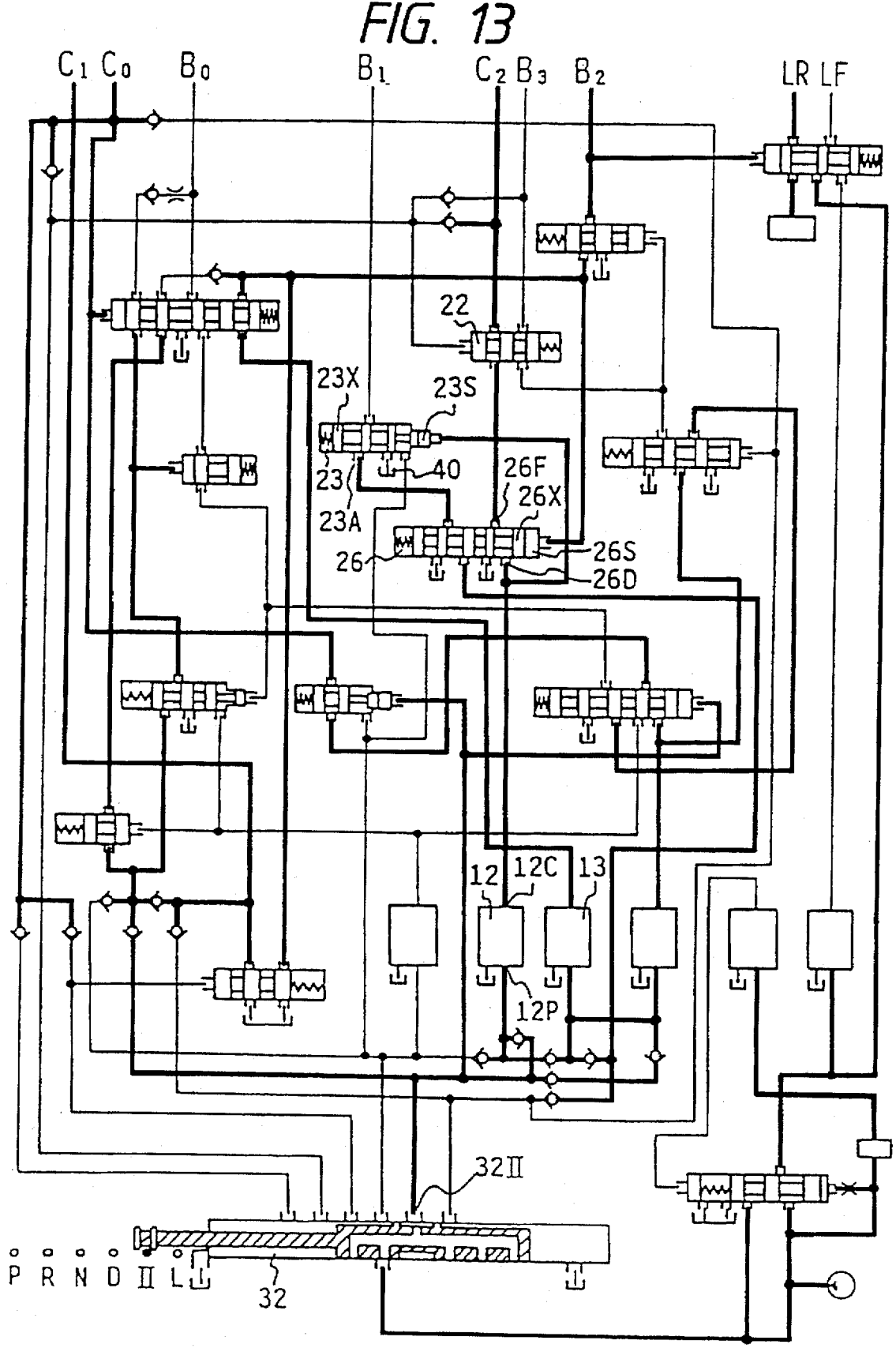
FIG. 13 is a hydraulic circuit diagram which shows the flow of hydraulic pressure in a 3rd mode of a II range.

Referring to FIG. 13, there is shown the flow of hydraulic pressure in a 3rd (II-3) mode for establishing 3rd speed in the II range.

The II-3 mode is different from the II-2 mode only in that the normally-open solenoid valve 12 is turned off to fluidly connect the pressure port 12P with the control port 12C, and other operations or hydraulic flow is identical.

When it is required to establish 3rd speed in the II range, the solenoid valve controller 400 turns off the solenoid valve 12 to provide the line pressure to the port 26D of the directional control valve 26. The directional control valve 26 is in a position to establish fluid communication between the ports 26D and 26F since the line pressure is supplied to the pressure chamber 26S from the solenoid valve 13 to bias the spool 26X in the left direction. The line pressure reaching the port 26D is thus supplied to the direct clutch C2 through the directional control valves 26 and 22. Additionally, the hydraulic pressure from the control port 12C of the solenoid valve 12 also acts on the pressure chamber 23S of the directional control valve 23 so that the spool 23X is displaced right against a spring force to block the port 23A. Therefore, the hydraulic pressure in the second coast brake B2 is released to the reservoir tank 40 through the directional control valve 23. In this manner, the forward clutch C1, the overdrive clutch C0, the direct clutch C2, and the second brake B2 are brought into engagement to establish the II-3 mode in the II range.

1st Mode (L-1) in L Range

Figure 14:
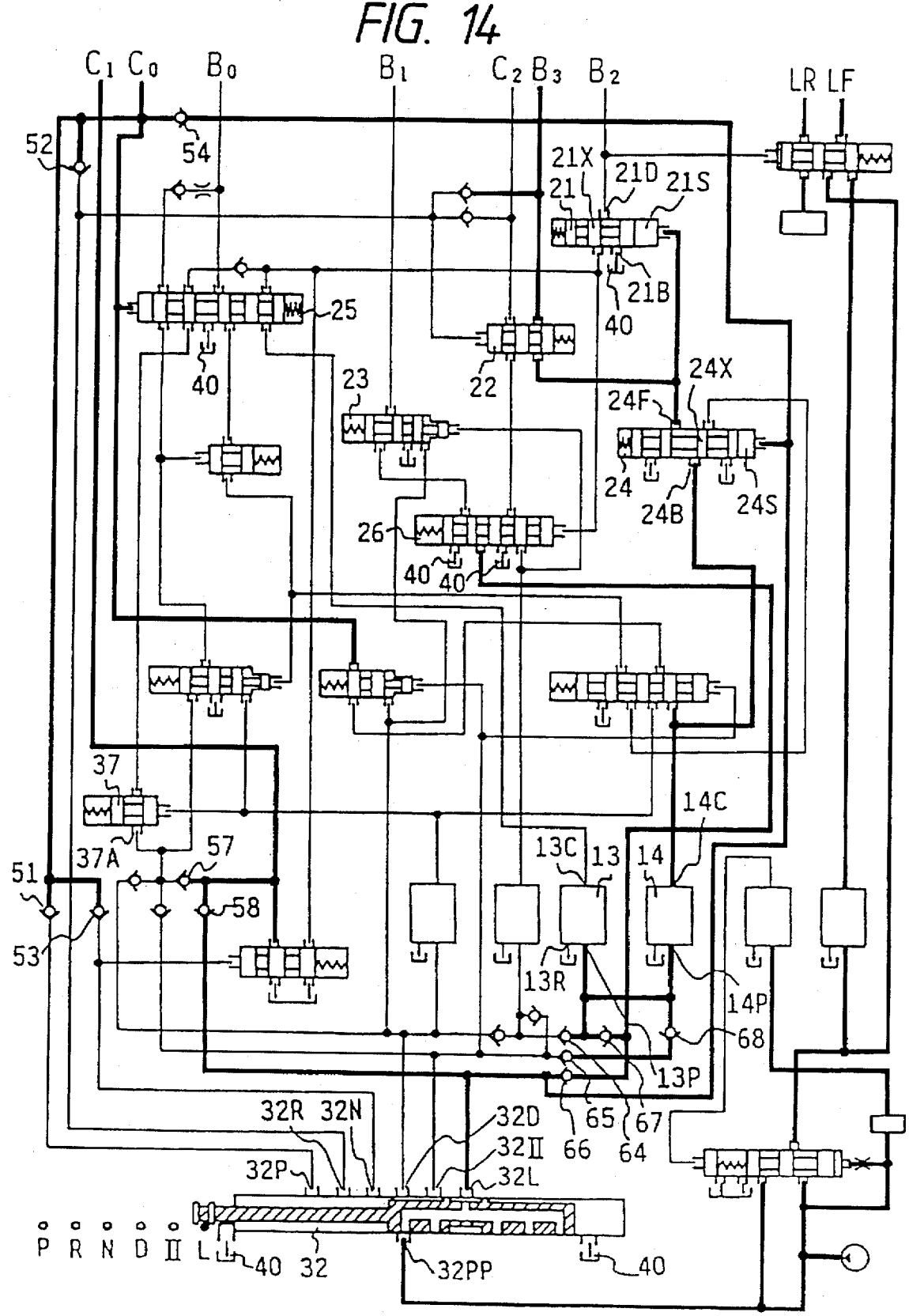
FIG. 14 is a hydraulic circuit diagram which shows the flow of hydraulic pressure in a 1st mode of an L range.

Referring to FIG. 14, there is shown the flow of hydraulic pressure in a 1st (L-1) mode for establishing 1st speed in the L range.

When the shift lever is moved to the L range and it is required to establish the 1st speed, the manual valve 32 assumes a valve position to establish fluid communication between the pressure port 32PP and the output port 32L to provide the line pressure to the forward clutch C1 through the check valve 58. The check valve 57 serves to block the hydraulic fluid flow to the output ports 32D and 32II of the manual valve 32 and to the port 37A of the directional control valve 37.

The line pressure from the output port 32L of the manual valve 32 also acts on the overdrive clutch C0 through the check valve 54. The check valves 51, 52, and 53 serve to block the hydraulic fluid flow to the ports 32P, 32R, and 32N of the manual valve 32. The line pressure is further supplied to the pressure port 14P of the solenoid valve 14 through the check valves 66 and 68, and also reaches the pressure port 13P of the solenoid valve 13 through the check valve 67. The check valves 65 and 64 serve to block the hydraulic fluid flow to the output ports 32D and 32II of the manual valve 32.

When it is required to establish the L-1 mode in the L range, the solenoid valve controller 400 energizes the normally-open solenoid valves 13 to establish fluid communications between the control port 13C and the return port 13R, while it deenergizes the normally-open solenoid valve 14 to establish fluid communication between the pressure port 14P and the control port 14C. Thus, the line pressure provided from the manual valve 32 is supplied through the solenoid valve 14 to the port 24B of the directional control valve 24. The directional control valve 24 is responsive to the line pressure supplied from the output port 32L of the manual valve 32 to the pressure chamber 24S thereof to displace the spool 24X to the left, establishing fluid communication between the ports 24B and 24F. This causes the hydraulic pressure reaching the port 24B to be supplied through the directional control valves 24 and 22 to the first and reverse brake B3.

The hydraulic pressure acting on the overdrive brake B0 is released to the reservoir tank 40 through the directional control valve 25. The hydraulic pressure in the direct clutch C2 is also drained to the reservoir tank 40 through the directional control valves 22 and 26. The hydraulic pressure in the first and reverse brake B3 acts on the pressure chamber 21C of the directional control valve 21 to bias the spool 21X to the left direction to establish fluid communication between the port 21B and the port 21D, so that the pressure in the second brake B2 is drained to the reservoir tank 40 through the directional control valve 21. In this manner, the forward clutch C1, the overdrive clutch C0, and the first and reverse brake B3 are actuated to achieve the L-1 mode in the L range.

2nd Mode (L-2) in L Range

Figure 15:
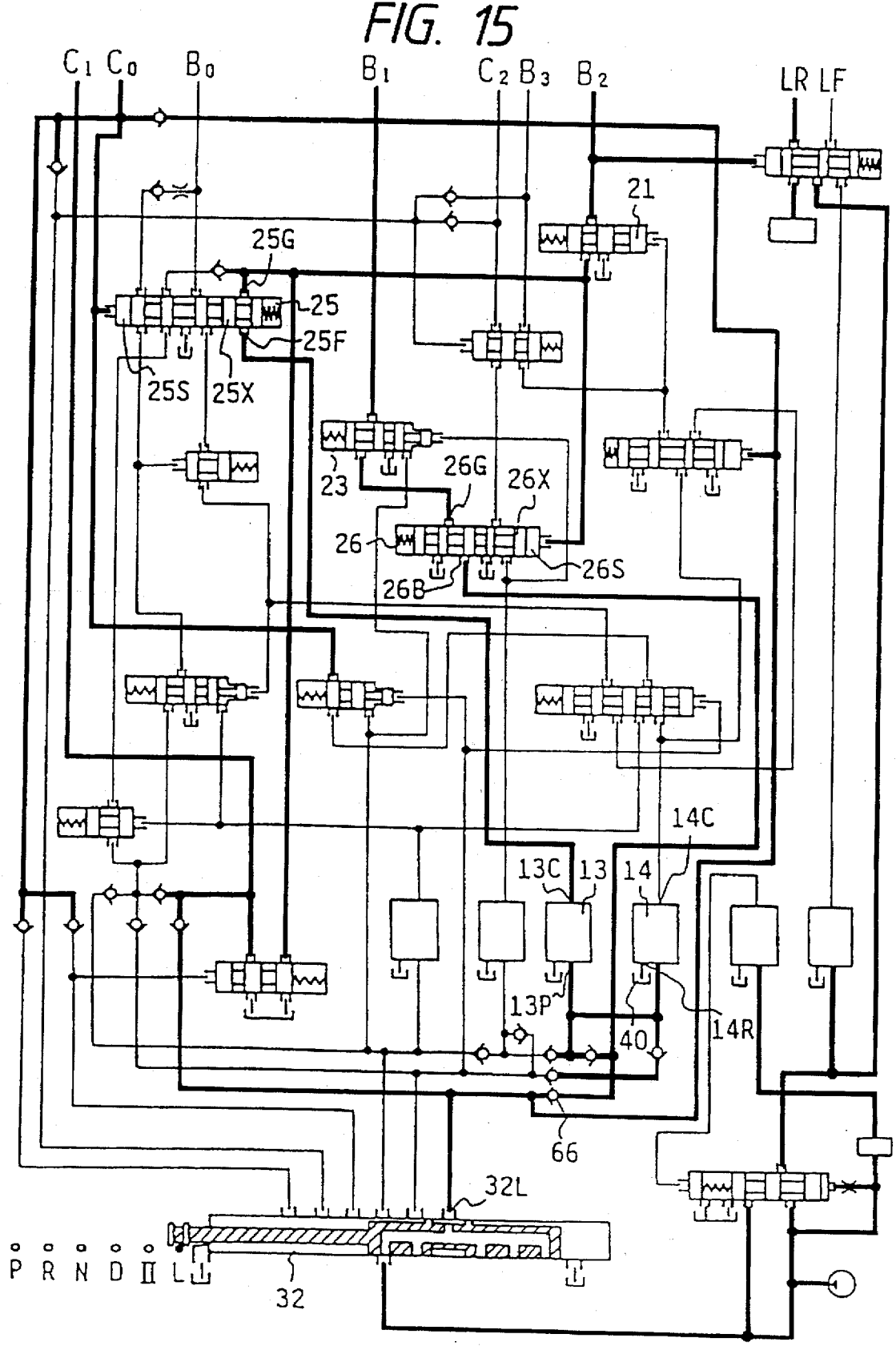
FIG. 15 is a hydraulic circuit diagram which shows the flow of hydraulic pressure in a 2nd mode of an L range.
Figure 16:
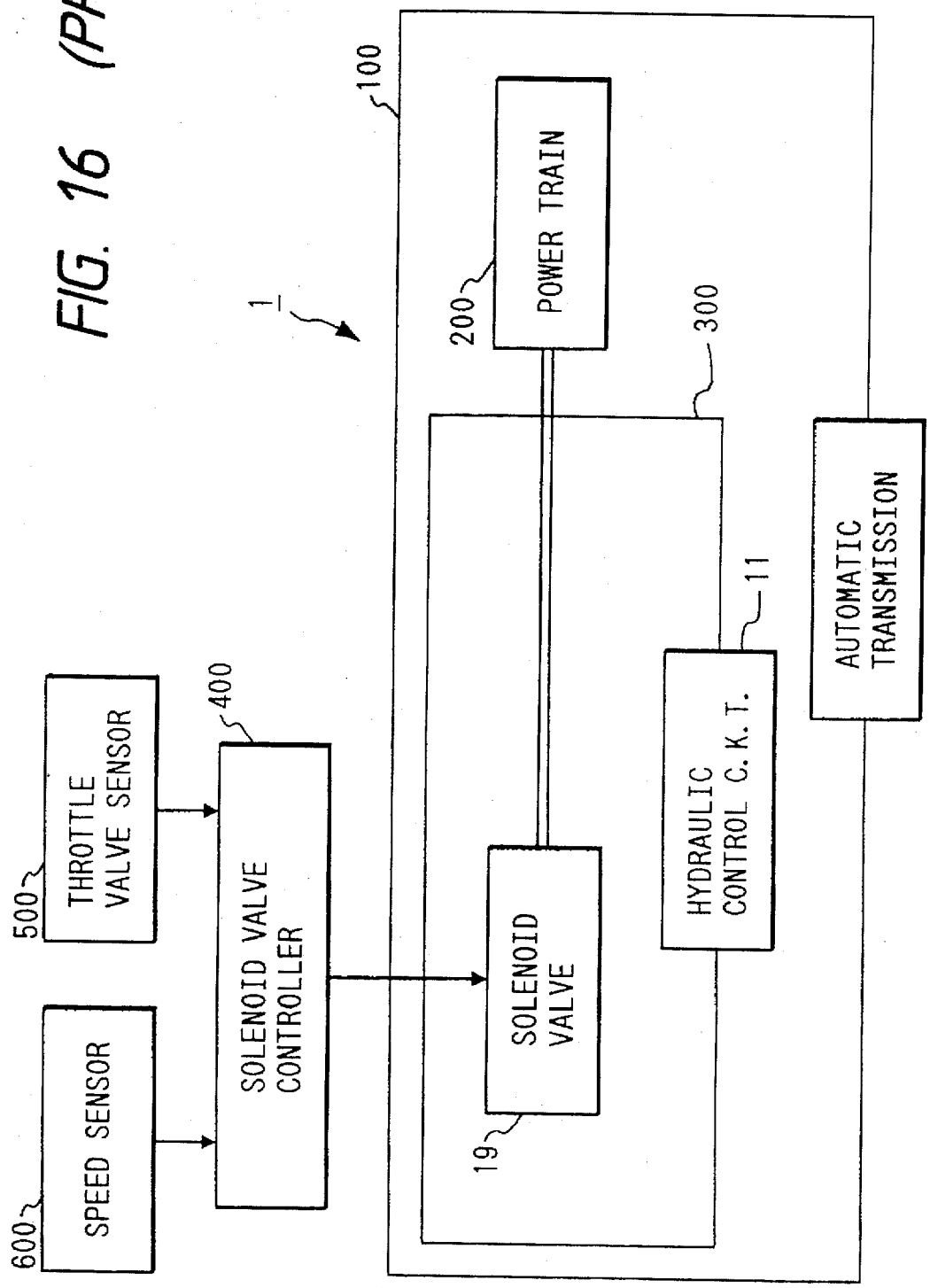
FIG. 16 is a block diagram which shows a conventional automatic transmission system.

Referring to FIG. 15, there is shown the flow of hydraulic pressure in a 2nd (L-2) mode for establishing 2nd speed in L range.

The L-2 mode is different from the L-1 mode only in that the normally-open solenoid valve 13 is turned off to fluidly connect the pressure port 13P with the control port 13C, while the solenoid valve 14 is turned on to establish fluid communication between the control port 14C and the return port 14R to discharge the pressure in the first and reverse brake B3. Other operations or hydraulic flow is identical.

When it is required to establish the 2nd speed in the L range, the solenoid valve controller 400 first turns off the solenoid valve 13 to provide the line pressure to the port 25F of the directional control valve 25. The directional control valve 25 is in a position to establish fluid communication between the ports 25F and 25G since the pressure in the pressure chamber 25S is raised to bias the spool 25X in the right direction. The line pressure reaching the port 25F is thus supplied to the second brake B2 through the directional control valve 21 and also supplied to the port 26S of the directional control valve 26. The directional control valve 26 thus assumes a valve position to urge the spool 26X in the left direction so that fluid communication between the ports 26B and 26G is established. Therefore, the hydraulic pressure reaching the port 26B outputted from the port 32L of the manual valve 32 through the check valve 66 is supplied to the second coast brake B1 passing through the directional control valves 26 and 23. With these valve operations, the forward clutch C1, the overdrive clutch C0, the second coast brake B1, and the second brake B2 are actuated to establish the L-2 mode in the L range.

Lock-up Mode

When a lock-up mode of transmission operation is not established, the hydraulic pressure is applied to the front hydraulic line LR of the lock-up clutch LC, while when the lock-up mode is established, its pressure is released. When the pressure in the pressure chamber 30S of the lock-up control valve 30 is, as shown in FIG. 7, drained, the spool 30X is biased by a spring force of the spring 30Z to the left to establish fluid communications between the port 30C and the port 30E and between the port 30F and the port 30B. The hydraulic pressure discharge from the off pump 80 and supplied to the port 30C of the lock-up control valve 30 passes therethrough toward the front hydraulic line LF. The hydraulic pressure in the front hydraulic line LF then flows to the off cooler 85 passing through the rear hydraulic line LR, so that the lock-up mode is not established.

Alternatively, the elevation in hydraulic pressure in the pressure chamber 30S of the lock-up control valve 30, as shown in FIG. 8, causes the spool 30X to be displaced to the right to establish fluid communications between the port 30E and the port 30D and among the port 30C, the port 30F, and 30B. The hydraulic pressure supplied to the port 30C thus flows to the oil cooler 85 from the port 30B. Additionally, when the normally-open solenoid 16 is turned on to establish fluid communication between the control port 16C and the return port 16R, the hydraulic pressure in the front hydraulic line LF is drained to the reservoir tank 40 through the lock-up control valve 30 and the control port 16C and the return port 16R of the solenoid valve 16 to establish the lock-up mode.

The lock-up clutch LC is so controlled as to switch between engagement and disengagement modes according to a given schedule based on a vehicle speed and a throttle valve opening degree monitored by the seed sensor 600 and the throttle valve sensor 500.

Electric Failure

If all the solenoid valves electrically malfunction, the solenoid valve controller 400 stops energizing them. This will cause the normally closed solenoid valves 11 and 15 to establish fluid communications between the control port 11C and the return port 11R and between the control port 15C and the return port 15R, respectively. Additionally, in the normally open solenoid valves 12, 13, 14, and 16, the pressure ports 12P, 13P, 14P, and 16P communicate with the control ports 12C, 13C, 14C, and 16C, respectively. These operative conditions are identical with those both in the O/D mode of the D range and in the II-3 mode of the II range. Thus, the shifting the shift lever to the D or II range allows the vehicle to travel in the O/D or II-3 mode.

Additionally, when the shift lever is shifted to the L range, the line pressure is supplied from the control port 13C of the solenoid valve 13 to the port 21A of the directional control valve 21 through the directional control valve 25, however, it is blocked at the port 21A since the spool 21A is displaced to the left by the elevated pressure in the pressure chamber 21A to close the port 21A with fluid communication between the ports 21B and 21D being established. The pressure in the second brake B2 is therefore drained to the reservoir tank 40 through the directional control valve 21, so that the forward clutch C1, the overdrive clutch C0, and the second brake B3 are activated to establish the L-1 mode in the L range.

Accordingly, even when a failure is detected in any of the solenoid valves and the solenoid valve controller 400 deenergizes all the solenoid valves, the O/D, II-3, or L-1 mode is established as long as the shift lever is shifted to the D, II, or L1 range. Since the solenoid valve 16 is, as mentioned above, of a normally open type, turning off the solenoid valve upon occurrence of a failure will cause the line pressure to be supplied to the front hydraulic line LF of the lock-up clutch LC, thereby inhibiting engagement of the lock-up clutch LC.

Solenoid Valve Sticking

A system operation in the event of any of the solenoid valves being stuck due to some contaminant will be described below.

If the solenoid valve 11 is stuck while fluid communication between the pressure port 11P and the control port 11C is established, in the D range, the line pressure from the output port 32D of the manual valve 32 is supplied to the overdrive clutch C0 through the solenoid valve 11 and the directional control valves 28 and 27, and is also supplied to the pressure chamber 25S of the directional control valve 25 to displace the spool 25X in the right direction. This causes pressure in the overdrive brake B0 to be released to the reservoir tank 40 and blocks the port 25I to stop the supply of the pressure to the second brake B2, but establishes fluid communication between the port 25F and the port 25G to supply the hydraulic pressure to the second brake B2. Thus, the D-3 mode is provided in the O/D mode.

As appreciated from the above, the directional control valve 25 prevents the overdrive clutch C0 and the overdrive brake B0 from being brought into engagement simultaneously to avoid mechanical lock of the power train. In other modes, a given gear ratio is established.

If the solenoid valve 11 is stuck while connecting the control port 11P with the return port 11R in the D range, the hydraulic pressure in the overdrive clutch C0 is drained to the reservoir tank 40 through the directional control valves 27 and 28 and the control port 11C and the return port 11R of the solenoid valve 11. In addition, the pressures in the pressure chamber 25S of the directional control valve 25, in the pressure chamber 37S of the directional control valve 37, and in the pressure chamber 36T of the directional control valve 36 are also released to the reservoir tank 40, urging the spool 25X to the left while urging the spools 36X and 37X to the right to establish fluid communications between the ports 25C and 25I, between the port 25B and the port 225J, between the port 36A and the port 36B, and between the port 37A and 37C. This provides the O/D mode in the D-3 mode. Additionally, in the D-2 and D-1 modes, the power train 200, although not meeting the operative conditions shown in Table 1, can provide a gear ratio between 2nd and 3rd gear ratios. In other modes, a given gear ratio is obtained.

If the solenoid valve 12 is stuck while fluid communication between the pressure port 12P and the control port 12C is established in the D and II ranges, the line pressure from the control port 12C reaches the port 26D of the directional control valve 26. When no pressure is supplied to the pressure chamber 26S, the port 26D is blocked by the spool 26X placed on the right. Alternatively, when the hydraulic pressure is pressure chamber pressure chamber 26S, the spool 26X is urged to the left to establish fluid communication between the port 26D and the port 26F. Thus, the D-3 mode is achieved in the D-2 mode, while the II-2 mode is achieved in the II-3 mode. In other modes, a given gear ratio is provided.

Further, in 2nd mode of the II range as shown in FIG. 12, the hydraulic pressures are, as can be seen in FIG. 12, applied to the clutches C0, C1 and the brakes B1 and B2 through the solenoid valves 13 and 14. When the solenoid valve 12 is stuck in a position to supply the hydraulic pressure, it is delivered to both the direct clutch C2 and the pressure chamber 23S of the directional control valve 23 to move the spool 23X to the left so that the port 23B communicates with the port 23E to drain the hydraulic pressure out of the overdrive brake B1. This prevents the hydraulic pressure from being supplied to both the overdrive brake B1 and the direct clutch C2, so that the power will not be locked mechanically.

If the solenoid valve 12 is stuck while connecting the control port 12P with the return port 12R, in the D range, the hydraulic pressure in the direct clutch C2 is released to the reservoir tank 40 through the solenoid valve 12. Therefore, the D-2 mode and the II-2 mode are established in the D-3 mode and the II-3 mode, respectively. In the O/D mode, the forward clutch C1, the overdrive brake B0, and the second brake B2 are pressurized for engagement, and the power train 200, although not meeting the operative conditions shown in Table 1, can provide 2nd and 3rd gear ratios. In other modes, a given gear ratio is obtained.

If the solenoid valve 13 is stuck while establishing fluid communication between the pressure port 13P and the control port 13C, the line pressure from the control port 13C reaches the port 25F of the directional control valve 25. When no pressure is applied to the overdrive clutch C0, that is, when no pressure acts on the pressure chamber 25S of the directional control valve 25, the spool 25X is displaced to the left to block the port 25F. In addition, when the hydraulic pressure reaches the port 21A of the directional control valve 21, the port 21A is blocked by the spool 21X placed on the left so that the hydraulic pressure is not supplied to the second brake B2 as long as the hydraulic pressure is applied to the first and reverse brake B3, that is, the hydraulic pressure is applied to the pressure chamber 21S of the directional control valve 21. Conversely, when the port 25F of the directional control valve 25 communicates with the port 25G and the port 21A of the directional control valve 21 communicates with the port 21D, the hydraulic pressure is applied to the second brake B2.

Therefore, the D-2, II-2, and L-2 modes are provided in the D-1, II-1, and L-1 modes, respectively. In other modes, a given gear ratio is obtained.

If the solenoid valve 13 is stuck while establishing fluid communication between the control port 13P and the return port 13R, the O/D mode is achieved as is since the directional control valve 25 establishes fluid communication between the ports 25C and 25I to provide the hydraulic pressure to the second brake B2. In the D-3 and the D-2 modes, the D-1 mode is established. In II-3 and II-2 modes, the II-1 mode is established. In the L-2 mode, the L-1 mode is established. Similarly, in the other modes, a given gear ratio is provided.

If the solenoid valve 14 is stuck while establishing fluid communication between the pressure port 14P and the control port 14C, in the D range, the hydraulic pressure from the control port 14C of the directional control valve 14 is supplied to the port 25E of the directional control valve 25 through the directional control valves 24, 28, and 35. The port 25E is however blocked since the hydraulic pressure is applied to the pressure chamber 25S to displace the spool 25X to the right. Therefore, in all the modes, a desired gear ratio is established.

In the L range, the hydraulic pressure from the control port 14C is supplied to the first and reverse brake B3 through the directional control valve 24 and to the pressure chamber 21S of the directional control valve 21 to shift the spool 21X to the left since the hydraulic pressure outputted from the port 32L of the manual valve 32 is applied to the pressure chamber 24S of the directional control valve 24 to move the spool 24X to the left, establishing fluid communication between the port 24B and the port 24F. Thus, fluid communication between the port 21B and the port 21D of the directional control valve 21 is achieved, while the port 21A is blocked to drain the hydraulic pressure from the second brake B2. The L-2 mode is thus changed to L1 mode.

In the II range, the solenoid valve 14 is in a position to allow the supply of the hydraulic pressure in all modes, so that all modes can be established as they are.

If the solenoid valve 14 is stuck while connecting the control port 14P with the return port 14R, in the D range, the hydraulic pressure in the overdrive brake B0 is discharged from the port 14R of the solenoid valve 14 to the reservoir tank 40 through the directional control valves 25, 35, 28, and 24. The hydraulic pressure in the pressure chamber 36S of the directional control valve 36 is also discharged from the solenoid valve 14 to the reservoir tank 40 through the directional control valves 28 and 24 to displace to spool 36X to the right, establishing fluid communication between the port 36A and the port 36E. The hydraulic pressure supplied from the port 32D of the manual valve 32 through the check valve 55 to the port 36A of the directional control valve 36 is thus delivered to the overdrive brake B0 through the directional control valve 25, the check valve 69, and the orifice 75, thereby providing the D-3 mode in the D range.

Additionally, in the II range, the hydraulic pressure in the overdrive clutch C0 is, similar to the D range, released to the reservoir tank 40, causing the hydraulic pressure in the pressure chamber 25S of the directional control valve 25 to be released. The spool 25X is thus displaced to the left to establish fluid communications between the port 25C and the port 25I and between the port 25B and the port 25J to supply the hydraulic pressures to the brakes B0 and B2, respectively. Further, the hydraulic pressure supplied to the brake B2 is also delivered to the pressure chamber 26S of the directional control valve 26 to urge the spool 26X to the left so that the port 26B and the port 26D communicate with the port 26G and the port 26F, respectively. Thus, in the II-1 and II-2 modes, the hydraulic pressure supplied from the port 32I of the manual valve 32 to the port 26B of the directional control valve 26 through the check valve 65 is directed to the second coast brake B1 through the directional control valves 26 and 23 so that a drive allowable mode, although different from the twelve modes shown in FIG. 3, is achieved.

In II-3 mode, the hydraulic pressure from the control port 12C is supplied to the pressure chamber 23S of the directional control valve 23 to move the spool 23X to the left, thereby establishing fluid communication between the port 23B and the port 23E to discharge the hydraulic pressure in the second coast brake B1 to the reservoir tank 40. Additionally, the hydraulic pressure from the control port 12C is also supplied to the direct clutch C2. Thus, a drive allowable mode, although different from the twelve modes shown in FIG. 3, is established.

In L-1 mode, the hydraulic pressure supplied to the first and reverse brake B3 is discharged from the solenoid valve 14 through the directional control valves 22 and 24 so that the D-1 mode is established. In the other modes, a given gear ratio is achieved.

As apparent from the above discussion, the automatic transmission system of the invention avoids undesirable double engagements of the clutches and the brakes causing a drive failure even if any one or some of the solenoid valves are stuck.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A hydraulic control system for an automatic transmission of a vehicle which includes a power train having a plurality of frictional elements which are selectively activated according to a pressure level of hydraulic pressure supplied thereto under a given operation schedule for establishing power transmission at one of preselected gear ratios, comprising:

a pressure source for providing the hydraulic pressure at a given level;

a hydraulic circuit connecting said pressure source and the plurality of the frictional elements;

a plurality of solenoid valves disposed in said hydraulic circuit, said solenoid valves selectively supplying the hydraulic pressure provided from said pressure source to the frictional elements;

a first directional control valve connected to establish given fluid paths in said hydraulic circuit when the hydraulic pressure is supplied through a first one of said solenoid valves to a first one of the frictional elements, said first directional control valve connected to drain the hydraulic pressure supplied from a second one of said solenoid valves to a second one of the frictional elements when the hydraulic pressure from said first solenoid valve to the first frictional element is drained, said first directional control valve connected to allow the hydraulic pressure to be supplied from said second solenoid valve to the second frictional element; and a second directional control valve connected to establish a fluid path communicating said pressure source with one of the first and second frictional elements when the hydraulic pressure from said first solenoid valve to the first frictional element is drained and when the hydraulic pressure from said second solenoid valve to the second frictional element is also drained.

2. A hydraulic control system as set forth in claim 1, further comprising pressure regulator means for reducing the hydraulic pressure supplied to the frictional elements to a preselected lower level for a given period of time upon engagement of the frictional elements.

3. A hydraulic control system as set forth in claim 1, further including plurality of mechanical directional control valves each having a pressure chamber on which the hydraulic pressure provided from said pressure source acts, each of said mechanical directional control valves selectively controlling the hydraulic pressure flow between the one of the frictional elements and the at least one of said solenoid valves according to a pressure level of the hydraulic pressure acting on the pressure chamber.

4. A hydraulic control system as set forth in claim 1, wherein said solenoid valves are connected to operate in accordance with a desired duty-cycle.

* * * * *